US012738834B2

(12) United States Patent
Chen et al.

(10) Patent No.: US 12,738,834 B2
(45) Date of Patent: Sep. 15, 2026

(54) CIRCULAR CURRENT SUPPRESSION METHOD, SWITCH CONTROL DEVICE, AND POWER CONVERSION SYSTEM

(71) Applicant: Delta Electronics, Inc., Taoyuan City (TW)

(72) Inventors: Hsin Chih Chen, Taoyuan City (TW); Li Hung Wang, Taoyuan City (TW); Yun Tsung Liu, Taoyuan City (TW); Chao Li Kao, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 135 days.

(21) Appl. No.: 18/925,120

(22) Filed: Oct. 24, 2024

(65) Prior Publication Data

US 2025/0226739 A1 Jul. 10, 2025

(30) Foreign Application Priority Data

Jan. 4, 2024 (CN) ......................... 202410010997.2

(51) Int. Cl.
*H02M 1/12* (2006.01)
*H02M 1/00* (2006.01)
(Continued)

(52) U.S. Cl.
CPC ........... *H02M 1/12* (2013.01); *H02M 1/0016* (2021.05); *H02M 1/0025* (2021.05);
(Continued)

(58) Field of Classification Search
CPC ............. H02M 1/0003; H02M 1/0009; H02M 1/0016; H02M 1/0025; H02M 1/007;
(Continued)

(56) References Cited

U.S. PATENT DOCUMENTS

2019/0097527 A1* 3/2019 Bhardwaj ............... H02M 1/44
2020/0304033 A1 9/2020 Rodriquez et al.
(Continued)

FOREIGN PATENT DOCUMENTS

CN 102055348 5/2011
CN 104065255 9/2014
(Continued)

OTHER PUBLICATIONS

European Search Report and the Euroean Search Opinion Dated May 16, 2025 From the European Patent Office Re. Application No. 24215736.0. (12 Pages).
(Continued)

*Primary Examiner* — Thienvu V Tran
*Assistant Examiner* — Shahzeb K Ahmad

(57) ABSTRACT

A circular current suppression method, a switch control device, and a power conversion system are disclosed, which convert a difference between a voltage converted from a common-mode current of several input currents of a power factor corrector and a bus-voltage difference into a reference current, convert a difference between a reference voltage and a total voltage into a total DC current, and add cosine even-numbered-harmonic components of the reference current based on the total DC current, a target current, and one of several input currents to calculate a compensation current that is converted into a voltage as one of at least one switching command output to the power factor corrector, thereby suppressing the circular current in a configuration of parallel power conversion modules.

20 Claims, 15 Drawing Sheets

(51) Int. Cl.

| | |
|---|---|
| ***H02M 1/42*** | (2007.01) |
| ***H02M 7/217*** | (2006.01) |
| ***H02M 7/219*** | (2006.01) |
| ***H02M 7/483*** | (2007.01) |

(52) U.S. Cl.
CPC ......... *H02M 1/123* (2021.05); *H02M 1/4216* (2013.01); *H02M 1/4233* (2013.01); *H02M 7/217* (2013.01); *H02M 7/219* (2013.01); *H02M 7/4833* (2021.05)

(58) Field of Classification Search
CPC .......... H02M 1/12; H02M 1/123; H02M 1/32; H02M 1/42; H02M 1/4216; H02M 1/4233; H02M 7/155; H02M 7/162; H02M 7/21; H02M 7/217; H02M 7/219; H02M 7/23; H02M 7/48; H02M 7/483; H02M 7/4833; H02M 7/487; Y02B 70/10
See application file for complete search history.

(56) References Cited

U.S. PATENT DOCUMENTS

| | | | | |
|---|---|---|---|---|
| 2025/0015699 | A1* | 1/2025 | Yang | B60L 53/10 |
| 2025/0023489 | A1* | 1/2025 | Dong | H02M 7/487 |
| 2025/0158402 | A1* | 5/2025 | Ning | H02J 3/01 |

FOREIGN PATENT DOCUMENTS

| | | | | |
|---|---|---|---|---|
| CN | 104659813 | | 5/2015 | |
| CN | 107623436 | | 1/2018 | |
| CN | 109067154 | | 12/2018 | |
| CN | 110176868 | | 8/2019 | |
| CN | 112436730 | | 3/2021 | |
| CN | 112909946 | A * | 6/2021 | H02M 7/483 |
| CN | 114614476 | | 6/2022 | |
| CN | 114744871 | | 7/2022 | |
| CN | 115864872 | | 3/2023 | |
| CN | 116827086 | | 9/2023 | |
| EP | 4506204 | | 2/2025 | |
| JP | 5476400 | | 4/2014 | |
| TW | 202131612 | | 8/2021 | |

OTHER PUBLICATIONS

Narimani et al. "Three-Phase Multimodule VSIs Using SHE-PWM to Reduce Zero-Sequence Circulating Current", IEEE Transactions on Industrial Electronics, XP011531105, 61(4): 1659-1668, Published Online Jun. 11, 2013.

Sun ct al. "Improvcd Modulation Mcchanism of Parallcl-Opcratcd T-Typc Thrcc- Level PWM Rectifiers for Neutral-Point Potential Balancing and Circulating Current Suppression", IEEE Transactions on Power Electronics, XP011686275, 33(9): 7466-7479, Published Online Nov. 13, 2017.

* cited by examiner

CIRCULAR CURRENT SUPPRESSION METHOD, SWITCH CONTROL DEVICE, AND POWER CONVERSION SYSTEM

CROSS REFERENCE TO RELATED APPLICATIONS

This application claims the benefit of priority of China Patent Applications No. 202410010997.2, filed on Jan. 4, 2024, the disclosures of which are incorporated herein by reference.

FIELD OF THE INVENTION

The present disclosure relates to the technical field of power conversion, specifically to a circular current suppression method, a switch control device, and a power conversion system for a parallel module configuration.

BACKGROUND OF THE INVENTION

In a power conversion system, if a multi-module parallel topology with alternating current (AC) input and direct current (DC) output is used, the greater the number of parallel modules, the larger the overall system volume will be. Therefore, module volume is an important factor when modules are integrated. To reduce the overall system volume, one approach is to omit several switches between a negative output terminal of a module and a negative terminal of a DC bus to directly connect a negative electrode of a DC-output terminal of each module to the negative terminal of the DC bus.

In addition, when the voltages of the DC bus of each module are different during system operation, the DC circular current will be generated. The circular current will reduce power conversion efficiency and current capacity, thereby affecting the overall operation of the system. Although there were technological solutions for suppressing circular currents in the past, they still need to be improved.

SUMMARY OF THE INVENTION

An object of the present disclosure is to provide a circular current suppression method, a switch control device, and a power conversion system to suppress circular current effectively in a configuration of parallel power conversion modules.

To achieve the above object, one aspect of the present disclosure provides a circular current suppression method applied to a plurality of power conversion modules connected in parallel, each power conversion module including a power factor corrector, a positive bus capacitor, and a negative bus capacitor, the power factor corrector adjusting at least one of a positive bus voltage and a negative bus voltage based on at least one switching command, wherein the method includes: calculating a common-mode current based on a plurality of input currents of the power factor corrector to convert into a first reference voltage; calculating a difference between the first reference voltage and a bus-voltage difference to convert into a first reference current, wherein the bus-voltage difference is a difference between the positive bus voltage and the negative bus voltage; calculating a difference between a second reference voltage and a total voltage to convert into a total DC current, wherein the total voltage is a sum of the positive bus voltage and the negative bus voltage; adding a plurality of cosine even-numbered-harmonic components of the first reference current based on the total DC current, a target current, and one of the plurality of input currents to calculate a compensation current in a harmonic-current control mode; and converting the compensation current into a compensation voltage to serve as one of at least one switching command and output to the power factor corrector.

To achieve the above object, one aspect of the present disclosure provides a switch control device, including a circular-current suppression module, a voltage balance module, and a switch control module. The circular-current suppression module is configured to calculate a common-mode current based on a plurality of input currents of a power factor corrector to convert into a first reference voltage. The voltage balance module is connected to the circular-current suppression module, wherein the voltage balance module is configured to calculate a difference between the first reference voltage and a bus-voltage difference to convert into a first reference current, wherein the bus-voltage difference is a difference between the positive bus voltage and the negative bus voltage. The switch control module is connected to the voltage balance module and includes a total DC voltage module and at least one current control module. The total DC voltage module is configured to calculate a difference between a second reference voltage and a total voltage to convert into a total DC current, wherein the total voltage is a sum of the positive bus voltage and the negative bus voltage. The at least one current control module is connected to the total DC voltage module and configured to add a plurality of cosine even-numbered-harmonic components of the first reference current based on the total DC current, a target current, and one of the plurality of input currents to calculate a compensation current in a harmonic-current control mode and convert the compensation current into a compensation voltage to serve as one of at least one switching command.

To achieve the above object, one aspect of the present disclosure provides a power conversion system that includes: a power source; a load; a plurality of power conversion modules connected in parallel, wherein each of the power conversion modules is configured to convert an AC power of the power source into a DC power to be provided to the load; and a plurality of switch control devices respectively connected to the plurality of power conversion modules, wherein the plurality of switch control devices are configured to execute the circular current suppression method mentioned as above.

In the circular current suppression method, the switch control device and the power conversion system of the present disclosure can control a power factor corrector to inject active current (i.e., cosine even-numbered-harmonic components or the zero-sequence voltage associated with the input currents) into at least one of the positive bus capacitor and the negative bus capacitor, thereby suppressing circular current and balancing the negative bus voltage. In this way, the effect of suppressing circular current and balancing the negative bus voltage can be achieved without changing a circuit architecture.

THE DETAILED DESCRIPTION OF PREFERRED EMBODIMENTS

To make the above and other objects, features, and advantages of the present disclosure more apparent and understandable, preferred embodiments will be described below, along with the accompanying drawings.

Figure 1:
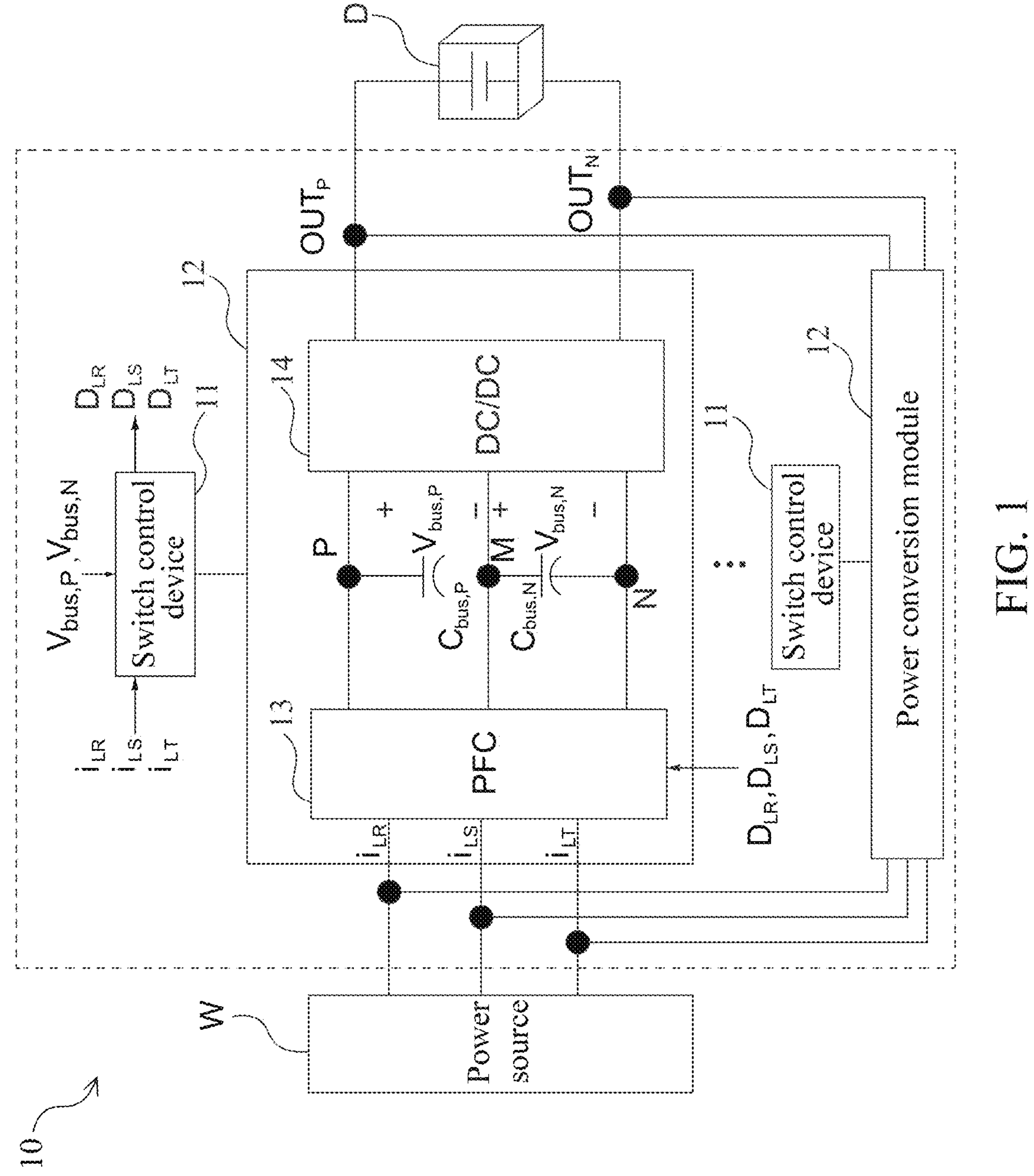
FIG. 1 is a schematic diagram of a three-phase power conversion system with multi-module parallel topology according to a first embodiment of the present disclosure.

FIG. 1 is a schematic diagram of a three-phase power conversion system 10 with a multi-module parallel topology according to a first embodiment of the present disclosure. The three-phase power conversion system 10 is configured to convert three-phase alternating current (AC) input power into direct current (DC) output power and adopts a multi-module parallel topology to increase the power conversion capacity of the system. However, because a negative output terminal $OUT_N$ of each module is directly connected to a negative terminal N of a DC bus, when a negative bus voltage $V_{bus,N}$ of each of modules is different, DC circular current will be generated.

Structurally, the three-phase power conversion system 10 includes a power source W, a plurality of switch control devices 11, a plurality of power conversion modules 12, and a load D, wherein the numbers of the switch control devices 11 and the power conversion modules 12 are the same. The power source W is a three-phase AC power source (such as R-phase, S-phase, and T-phase AC electric power), and the load D is, for example, a DC battery or a DC load (such as a motor). The plurality of power conversion modules 12 are connected in parallel, and each of the power conversion modules 12 is configured to convert three-phase AC power into DC power. The plurality of switch control devices 11 are connected to the plurality of power conversion modules 12, respectively. Each switch control device 11 is configured to generate a plurality of switching commands $D_{LR}$, $D_{LS}$, and $D_{LT}$ according to input currents $i_{LR}$, $i_{LS}$, and $i_{LT}$, a positive bus voltage $V_{bus,P}$, and a negative bus voltage $V_{bus,N}$. It should be noted that, assuming there are k identical power conversion modules 12, then the total input currents $i_{LR,total}$, $i_{LS,total}$, $i_{LT,total}$ provided by the power source W are sums of input currents input to the k power conversion modules 12, respectively and can be expressed as the following equations:

$$i_{LR,total} = i_{LR,1} + \dots + i_{LR,k};$$

$$i_{LS,total} = i_{LS,1} + \dots + i_{LS,k};$$

$$i_{LT,total} = i_{LT,1} + \dots + i_{LT,k},$$

wherein k is a natural number.

Each power conversion module 12 includes a power factor corrector (PFC) 13, a positive bus capacitor $C_{bus,P}$, a negative bus capacitor $C_{bus,N}$, and a direct current converter (DC/DC) 14. The power factor corrector 13 is connected to the power source W and is configured to convert the input currents $i_{LR}$, $i_{LS}$, and $i_{LT}$ into a positive bus voltage $V_{bus,P}$ and a negative bus voltage $V_{bus,N}$ according to a plurality of switching commands $D_{LR}$, $D_{LS}$, and $D_{LT}$. The power factor corrector 13 and the DC converter 14 are connected via three buses, wherein the three buses correspond to a positive terminal P, a neutral terminal M, and a negative terminal N, respectively. The positive bus capacitor $C_{bus,P}$ and the negative bus capacitor $C_{bus,N}$ are connected in series with each other. A positive electrode of the positive bus capacitor $C_{bus,P}$ is connected to the positive terminal P, and a negative electrode of the positive bus capacitor $C_{bus,P}$ is connected to the neutral terminal M, and a voltage across the positive bus capacitor $C_{bus,P}$ is the positive bus voltage $V_{bus,P}$. A positive electrode of the negative bus capacitor $C_{bus,N}$ is connected to the neutral terminal M, a negative electrode of the negative bus capacitor $C_{bus,N}$ is connected to the negative terminal N, and a voltage across the negative bus capacitor $C_{bus,N}$ is the negative bus voltage $V_{bus,N}$. The DC converter 14 is connected to the power factor corrector 13, the positive bus capacitor $C_{bus,P}$, and the negative bus capacitor $C_{bus,N}$ and is configured to convert the positive bus voltage $V_{bus,P}$ and the negative bus voltage $V_{bus,N}$ into a voltage output to the positive output terminal $OUT_P$ and the negative output terminal $OUT_N$. In some embodiments, the power factor corrector 13 may be, for example, an active or passive power factor correction circuit configured to rectify and perform power factor correction on the power source W. In some embodiments, the DC converter 14 may be, for example, the form of forward (e.g., energy is transferred directly through the magnetic field), flyback (e.g., energy is stored in the magnetic field), transformerless (non-isolated), or having a transformer (isolated), such as buck, boost, buck-boost, boost-buck, SEPIC, or CUK DC converters, but are not limited to the description here.

In operation, when circular current is detected, the switch control device 11 is configured to generate the plurality of switching commands $D_{LR}$, $D_{LS}$, and $D_{LT}$ and send them to the power factor corrector 13 according to the input currents $i_{LR}$, $i_{LS}$, $i_{LT}$, the positive bus voltage $V_{bus,P}$, and the negative bus voltage $V_{bus,N}$. The power factor corrector 13 adjusts at least one of the positive bus voltage $V_{bus,P}$ and the negative bus voltage $V_{bus,N}$ according to the plurality of switching commands $D_{LR}$, $D_{LS}$, and $D_{LT}$ to suppress the circular current. In this way, by the operations of the switch control device 11, a voltage difference of the negative bus voltage $V_{bus,N}$ of each power conversion module 12 will be zero, which can effectively suppress the circular current in the three-phase power conversion system 10.

Figure 2:
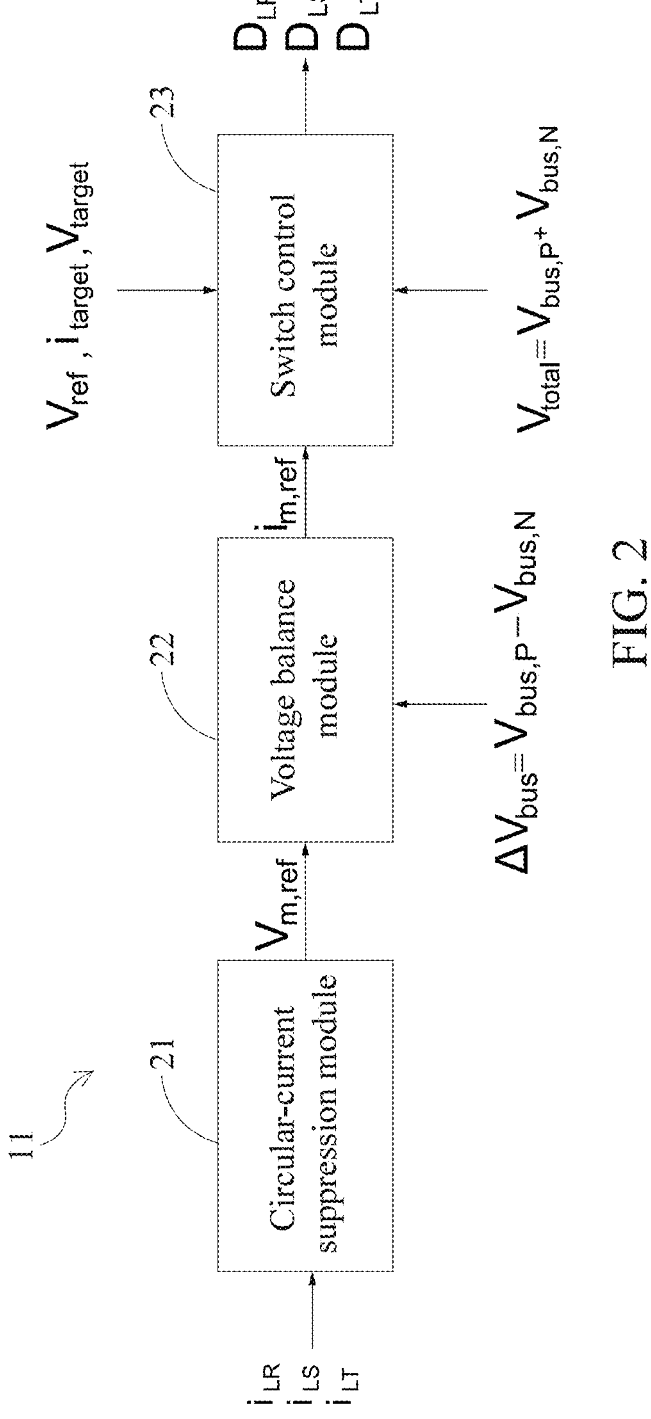
FIG. 2 is a functional-block diagram of a switch control device shown in FIG. 1.

FIG. 2 is a functional-block diagram of the switch control device 11 shown in FIG. 1. The switch control device 11 includes a circular-current suppression module 21, a voltage balance module 22, and a switch control module 23. Structurally, the circular-current suppression module 21 is connected to the power source W (not shown in FIG. 2, please refer to FIG. 1) and is configured to generate a first reference voltage $V_{m,ref}$ according to the input currents $i_{LR}$, $i_{LS}$, and $i_{LT}$. The voltage balance module 22 is connected to the circular-current suppression module 21 and is configured to generate a first reference current $i_{m,ref}$ according to the first reference voltage $V_{m,ref}$ and a bus-voltage difference $\Delta V_{bus}$, wherein the bus-voltage difference $\Delta V_{bus}=V_{bus,P}-V_{bus,N}$. The switch control module 23 is connected to the voltage balance module 22 and is configured to generate the plurality of switching commands $D_{LR}$, $D_{LS}$, and $D_{LT}$ according to the first reference current $i_{m,ref}$, a second reference voltage $V_{ref}$, a target current $i_{target}$, a target voltage $V_{target}$, and a total voltage $V_{total}$, wherein the total voltage $V_{total}=V_{bus,P}+V_{bus,N}$. In some embodiments, the second reference voltage $V_{ref}$, the target current $i_{target}$, and the target voltage $V_{target}$ can be preset and stored in a memory (not shown in FIG. 2) or can be adjusted in real time and come from a user input interface.

In operation, the circular-current suppression module 21 first calculates circular current corresponding to the input currents $i_{LR}$, $i_{LS}$, and $i_{LT}$ and converts it into the first reference voltage $V_{m,ref}$. Next, the voltage balance module 22 calculates a difference between the first reference voltage $V_{m,ref}$ and the bus-voltage difference $\Delta V_{bus}$ and converts it into the first reference current $i_{m,ref}$. Finally, the switch control module 23 generates the plurality of switching commands $D_{LR}$, $D_{LS}$, and $D_{LT}$ to the power factor corrector 13 according to the first reference current $i_{m,ref}$, the second reference voltage $V_{ref}$, the target current $i_{target}$, the target voltage $V_{target}$, and the total voltage $V_{total}$. After several switching control operations, the switching control device 11 can converge the circular current to the target current $i_{target}$ and converge the bus-voltage difference $\Delta V_{bus}$ to the target voltage $V_{target}$, thereby achieving the effect of suppressing the circular current.

Figure 3:
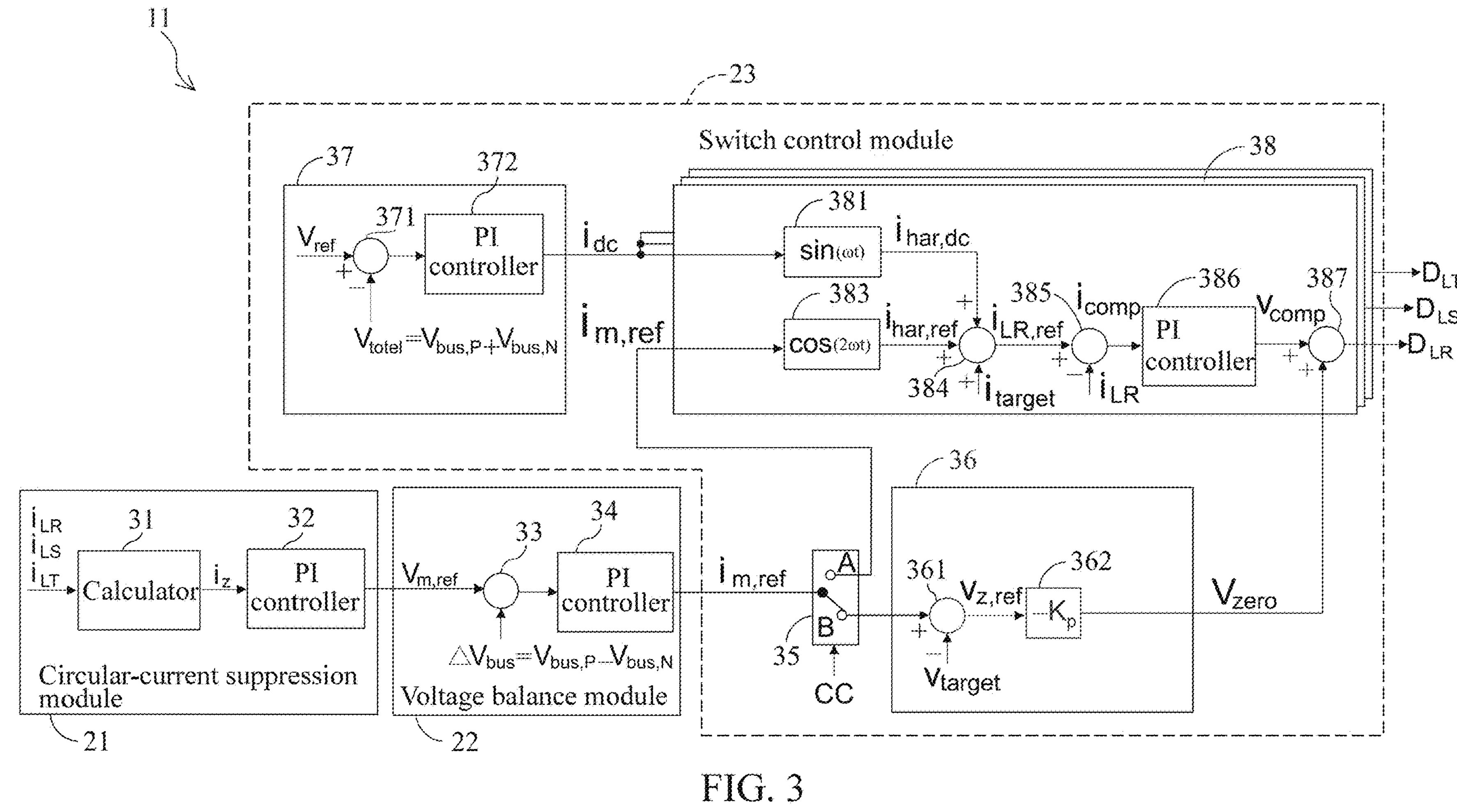
FIG. 3 is a detailed functional-block diagram of the switch control device shown in FIG. 2.

In detail, FIG. 3 is a detailed functional-block diagram of the switch control device 11 shown in FIG. 2. The circular-current suppression module 21 includes a calculator 31 and a proportional-integral (PI) controller 32. The calculator 31 is connected to the power source W (not shown in FIG. 3, please refer to FIG. 1) and is configured to calculate a common-mode current $i_z$ according to the following equation (1):

$$i_z = \frac{i_{LR} + i_{LS} + i_{LT}}{3} \quad (1)$$

It should be understood that when an average value of the input currents $i_{LR}$, $i_{LS}$, and $i_{LT}$ at any point in time is zero, the common-mode current $i_z$ is zero, indicating that there is no circular current in the power conversion module 12 of FIG. 1. Therefore, the calculator 31 is configured to calculate the average value of the input currents $i_{LR}$, $i_{LS}$, and $i_{LT}$ to calculate the common-mode current $i_z$ to detect the circular current. The PI controller 32 is connected to the calculator 31 and is configured to convert the common-mode current $i_z$ to the first reference voltage $V_{m,ref}$.

The voltage balance module 22 includes a subtractor 33 and a PI controller 34. The subtractor 33 is connected to the PI controller 32 of the circular-current suppression module 21 and is configured to subtract the bus-voltage difference $\Delta V_{bus}$ from the first reference voltage $V_{m,ref}$ to generate a difference. The PI controller 34 is connected to the subtractor 33 and is configured to convert the difference between the first reference voltage $V_{m,ref}$ and the bus-voltage difference $\Delta V_{bus}$ into the first reference current $i_{m,ref}$.

The switch control module 23 includes a selector 35, a zero-sequence voltage injection module 36, a total DC voltage module 37, and a plurality of current control modules 38. The selector 35 is connected to the PI controller 34 of the voltage balance module 22 and is configured to output the first reference current $i_{m,ref}$ to the zero-sequence voltage injection module 36 or the plurality of current control modules 38 according to a control command CC. The zero-sequence voltage injection module 36 is connected to the selector 35 and is configured to generate a zero-sequence voltage $V_{zero}$ according to the first reference current $i_{m,ref}$ and the target voltage $V_{target}$. The total DC voltage module 37 is configured to generate a total DC current $i_{dc}$ according to the second reference voltage $V_{ref}$ and the total voltage $V_{total}$. The plurality of current control modules 38 are connected to the total DC voltage module 37, the selector 35, and the zero-sequence voltage injection module 36 and are configured to generate the plurality of switching commands $D_{LR}$, $D_{LS}$, and $D_{LT}$ according to the total DC current $i_{dc}$, the target current $i_{target}$, the input currents $i_{LR}$, $i_{LS}$, $i_{LT}$, and the first reference current $i_{m,ref}$ or according to the zero-sequence voltage $V_{zero}$. For example, in a harmonic current control mode, the selector 35 outputs the first reference current $i_{m,ref}$ to the plurality of current control modules 38, such that the plurality of current control modules 38 generate the plurality of switching commands $D_{LR}$, $D_{LS}$, and $D_{LT}$ according to the first reference current $i_{m,ref}$; in another aspect, in a zero-sequence voltage injection mode, the selector 35 outputs the first reference current $i_{m,ref}$ to the zero-sequence voltage injection module 36, such that the plurality of current control module 38 generate the plurality of switching commands $D_{LR}$, $D_{LS}$, and $D_{LT}$ according to the zero-sequence voltage $V_{zero}$.

In detail, the zero-sequence voltage injection module 36 includes a subtractor 361 and a gain amplifier 362. The subtractor 361 is connected to the selector 35 and is configured to subtract the target voltage $V_{target}$ from a voltage corresponding to the first reference current $i_{m,ref}$ to generate a third reference voltage $V_{z,ref}$. In an embodiment, an magnitude of the target voltage $V_{target}$ is zero to instruct the zero-sequence voltage injection module 36 to converge the voltage corresponding to the first reference current $i_{m,ref}$ until it is converged to zero; in another embodiment, according to actual application requirements, the magnitude of the target voltage $V_{target}$ is a tolerance value that is not zero. The gain amplifier 362 is connected to the subtractor 361 and is configured to multiply the third reference voltage $V_{z,ref}$ by a coefficient $(-K_p)$ to generate the zero-sequence voltage $V_{zero}$, wherein the coefficient $K_p$ can be anyone real number.

The total DC voltage module 37 includes a subtractor 371 and a PI controller 372. The subtractor 371 is configured to subtract the total voltage $V_{total}$ from the second reference voltage $V_{ref}$. The PI controller 372 is connected to the subtractor 371 and is configured to convert a difference between the second reference voltage $V_{ref}$ and the total voltage $V_{total}$ into a total direct current $i_{dc}$.

The plurality of current control modules 38 are configured to generate the plurality of switching commands $D_{LR}$, $D_{LS}$, and $D_{LT}$, respectively. Here, only a current control module for one phase (e.g., R-phase electric power) is used as an example and current control modules for the remaining phases (i.e., S-phase and T-phase electric power) can be deduced in the same way. The current control module 38 includes a sine function generator 381, a cosine function generator 383, an adder 384, a subtractor 385, a PI controller 386, and an adder 387.

The sine function generator 381 is connected to the total DC voltage module 37 and is configured to extract the sine integer-harmonic component $i_{har,dc}$ of the total DC current $i_{dc}$, wherein the angular frequency of the sine integer harmonics is ω. The cosine function generator 383 is connected to the selector 35 and is configured to extract the cosine even-numbered harmonic components $i_{har,ref}$ of the first reference current $i_{m,ref}$, wherein the angular frequency of the even-numbered harmonics is (E*2*ω), and E is a natural number. The adder 384 is connected to the sine function generator 381 and the cosine function generator 383 and is configured to add the target current $i_{target}$, the sine integer-harmonic component $i_{har,dc}$, and the cosine even-numbered harmonic components $i_{har,ref}$ to generate a second reference current $i_{LR,ref}$ (this is used for the R-phase electric power; currents $i_{LS,ref}$ and $i_{LT,ref}$ are used for S-phase and T-phase electric power, respectively). In this embodiment, the magnitude of the target current $i_{target}$ is zero to instruct the current control module 38 to converge the first reference current $i_{m,ref}$ until it is converged to zero; in other embodiments, according to actual application requirements, the magnitude of the target current $i_{target}$ is a tolerance value that is not zero. The subtractor 385 is connected to the adder 384 and is configured to subtract the input current $i_{LR}$ from the second reference current $i_{LR,ref}$ (this is used for the R-phase electric power; currents $i_{LS}$ and $i_{LT}$ are used for S-phase and T-phase electric power, respectively) to generate a compensation current $i_{comp}$. The PI controller 386 is connected to the subtractor 385 and is configured to convert the compensation current $i_{comp}$ into a compensation voltage $V_{comp}$. The adder 387 is connected to the PI controller 386 and is configured to add the compensation voltage $V_{comp}$ and the zero-sequence voltage $V_{zero}$ to generate the switching command $D_{LR}$ (this is used for the R-phase electric power; switching commands $D_{LS}$ and $D_{LT}$ are used for S-phase and T-phase electric power, respectively).

It should be noted that in the harmonic current control mode, the selector 35 outputs the first reference current $i_{m,ref}$ to the plurality of current control modules 38, and an output result of the adder 387 contains the compensation voltage $V_{comp}$ derived from the first reference current $i_{m,ref}$; in another aspect, in the zero-sequence voltage injection mode, the selector 35 outputs the first reference current $i_{m,ref}$ to the zero-sequence voltage injection module 36, and the output result of the adder 387 contains the zero sequence voltage $V_{zero}$ derived from the reference current $i_{m,ref}$.

Figure 4:
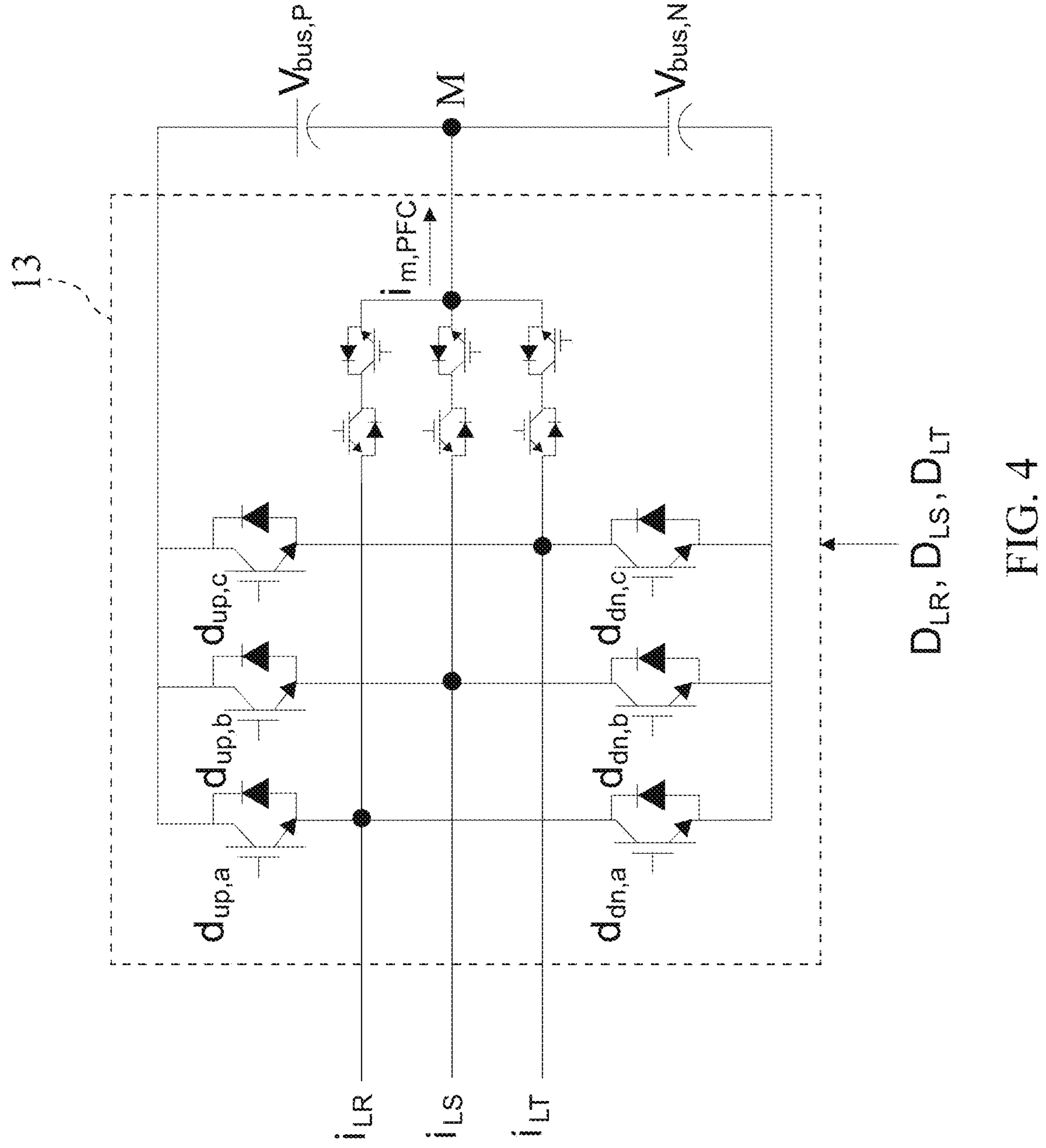
FIG. 4 is a schematic circuit diagram of a T-type neutral-point-clamping power factor corrector of a three-phase power conversion system.

In one embodiment, the power factor corrector 13 of FIG. 1 can be implemented by using a T-type neutral-point-clamping (NPC) architecture, such as the power factor corrector 13 shown in FIG. 4. For the purpose of illustration, the circuit is simplified, and not all components of the power factor corrector 13 are shown in FIG. 4. The power factor corrector 13 is configured to generate an output current $i_{m,PFC}$ according to the input currents $i_{LR}$, $i_{LS}$, and $i_{LT}$ and the plurality of switching commands $D_{LR}$, $D_{LS}$, and $D_{LT}$ to charge the two bus capacitors to adjust the positive bus voltage $V_{bus,P}$ and the negative bus voltage $V_{bus,N}$. It should be noted that in order to suppress circular current and balance the negative bus voltage $V_{bus,N}$, the power factor corrector 13 can be adopted to inject active current or zero-sequence voltage into at least one of the positive bus capacitance $C_{bus,P}$ and the negative bus capacitance $C_{bus,N}$ (as shown in FIG. 1), thereby adjusting at least one of the positive bus voltage $V_{bus,P}$ and the negative bus voltages $V_{bus,N}$.

For example, the output current $i_{m,PFC}$ of the power factor corrector 13 can be expressed as the following equation (2):

$$i_{m,PFC} = i_a d_{up,a} + i_b d_{up,b} + i_c d_{up,c} + i_a d_{dn,a} + i_b d_{dn,b} + i_c d_{dn,c} \tag{2}$$

wherein $i_a d_{up,a}+i_b d_{up,b}+i_c d_{up,c}$ is a sum of currents in a positive half cycle; $i_a d_{dn,a}+i_b d_{dn,b}+i_c d_{dn,c}$ is a sum of currents in a negative half cycle; $i_a$, $i_b$, and $i_c$ are the output current components associated with the input currents $i_{LR}$, $i_{LS}$, and $i_{LT}$, respectively; $d_{up,a}$, $d_{up,b}$, and $d_{up,c}$ are switching control functions of the positive half cycle, respectively; and $d_{dn,a}$, $d_{dn,b}$, and $d_{dn,c}$ are the switching control functions of the negative half cycle, respectively.

Furthermore, if the positive and negative half-cycle currents in equation (2) are integrated together, the output current $i_{m,PFC}$ of the power factor corrector 13 can be rewritten as the following equation (3):

$$i_{m,PFC} = i_a|d_a| + i_b|d_b| + i_c|d_c|, \tag{3}$$

wherein $|d_a|$, $|d_b|$, and $|d_c|$ are respectively switching control functions of a full cycle associated with the input currents $i_{LR}$, $i_{LS}$, and $i_{LT}$. The power factor corrector 13 generates a duty-cycle signal group for turning on (ON) and turning off (OFF) a switch group according to the plurality of switching control functions $|d_a|$, $|d_b|$, and $|d_c|$ to adjust the output current $i_{m,PFC}$. Therefore, the plurality of switching commands $D_{LR}$, $D_{LS}$, and $D_{LT}$ indicate the plurality of switch control functions $|d_a|$, $|d_b|$, and $|d_c|$, respectively.

It should be noted that, in order to have the output current $i_{m,PFC}$ to generate effective power (i.e., actual power) on the two bus capacitors, the output current $i_{m,PFC}$ of the power factor corrector 13 injects the cosine even-numbered-harmonic components associated with the input current $i_{LR}$, $i_{LS}$, and $i_{LT}$ into at least one of the two bus capacitors. Accordingly, the switch control functions $|d_a|$, $|d_b|$, and $|d_c|$ can be expressed as the following equations (4-a), (4-b), and (4-c):

$$|d_a| = \frac{2}{\pi}A - \frac{4A}{\pi}\left(\frac{1}{3}\cos(2\omega t) + \frac{1}{15}\cos(4\omega t) + \dots\right) \tag{4-a}$$

$$|d_b| = \frac{2}{\pi}A - \frac{4A}{\pi}\left(\frac{1}{3}\cos\left(2\omega t + \frac{2\pi}{3}\right) + \frac{1}{15}\cos\left(4\omega t - \frac{2\pi}{3}\right) + \dots\right) \tag{4-b}$$

$$|d_c| = \frac{2}{\pi}A - \frac{4A}{\pi}\left(\frac{1}{3}\cos\left(2\omega t - \frac{2\pi}{3}\right) + \frac{1}{15}\cos\left(4\omega t + \frac{2\pi}{3}\right) + \dots\right) \tag{4-c}$$

Therefore, by injecting currents with cosine even-number harmonics (such as 2, 4, and . . . numbered harmonics) to the power factor corrector 13, at least one of the positive bus voltage $V_{bus,P}$ and the negative bus capacitance $V_{bus,N}$ can be adjusted without changing a circuit architecture of the power factor corrector 13 and the power conversion module 12 to suppress circular current.

Figure 5:
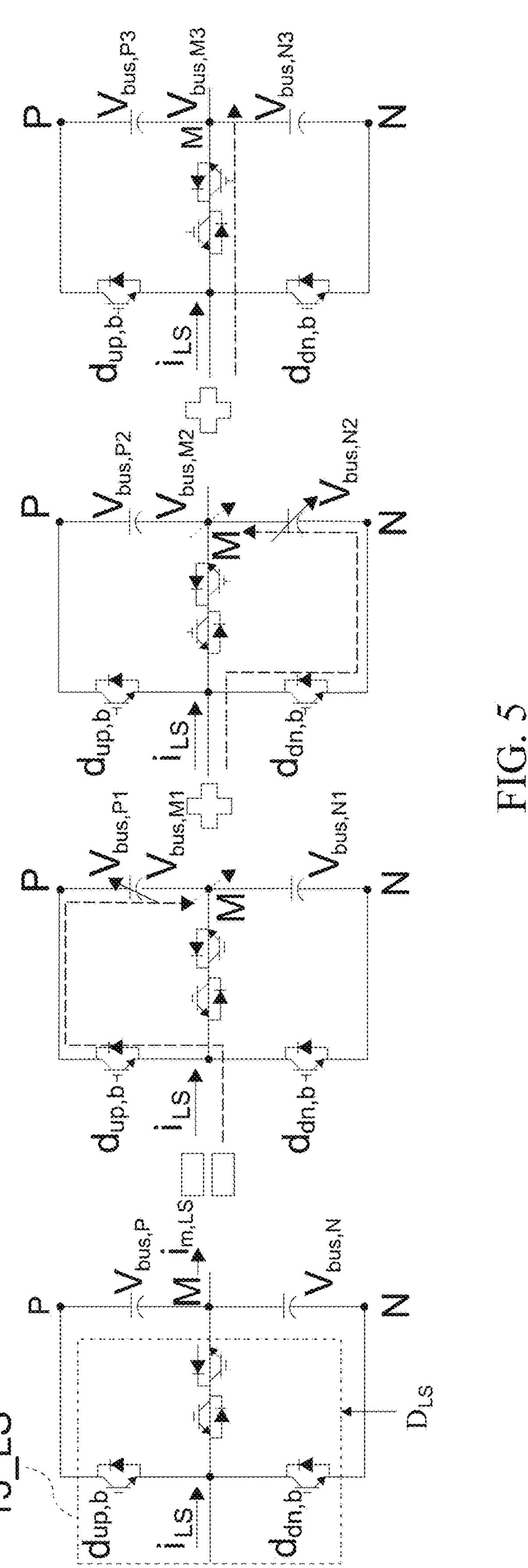
FIG. 5 is a schematic diagram illustrating circuit operations of the T-type neutral-point-clamping power factor corrector shown in FIG. 4.

FIG. 5 is a schematic diagram illustrating circuit operations of the T-type neutral-point-clamping power factor corrector. Here, only the operation of the power factor corrector 13_LS for one phase (e.g., the S-phase electric power) is taken as an example, and the operation of the power factor corrector 13 for the other phases (i.e., the R-phase and T-phase electric power) can be deduced in the same way. The power factor corrector 13_LS is configured to operate in three states according to the switching command $D_{LS}$, wherein the switching command $D_{LS}$ is used to control the on and off states of the plurality of switches to generate an output current $i_{m,LS}$. In a first operation state, the input current $i_{LS}$ flows to the positive terminal P through the positive half-cycle path, causing the positive bus voltage $V_{bus,P1}$ to rise and the negative bus voltage $V_{bus,N1}$ to remain and be unchanged. In the case of the total voltage remaining the same, the terminal voltage $V_{bus,M1}$ of the neutral terminal M drops. In a second operation state, the input current $i_{LS}$ flows to the negative terminal N through the negative half-cycle path, causing the negative bus voltage $V_{bus,N2}$ to drop and the positive bus voltage $V_{bus,P2}$ to remain the same. In a case that the total voltage remains and is unchanged, the terminal voltage $V_{bus,M2}$ of the neutral terminal M drops. In a third operation state, the input current $i_L$S flows to the neutral terminal M through the intermediate path, because the input current $i_{LS}$ does not go through the bus capacitors, the positive bus voltage $V_{bus,P3}$ and the negative bus voltage $V_{bus,N3}$ do not increase or decrease. In the case of the total voltage remaining the same, the terminal voltage $V_{bus,M3}$ of the neutral terminal M remains at a specific value. Therefore, by using the switching command $D_{LS}$, the bus voltage and the terminal voltage of the neutral terminal M can be effectively adjusted to balance the negative bus voltage and suppress the circular current.

Figure 6:
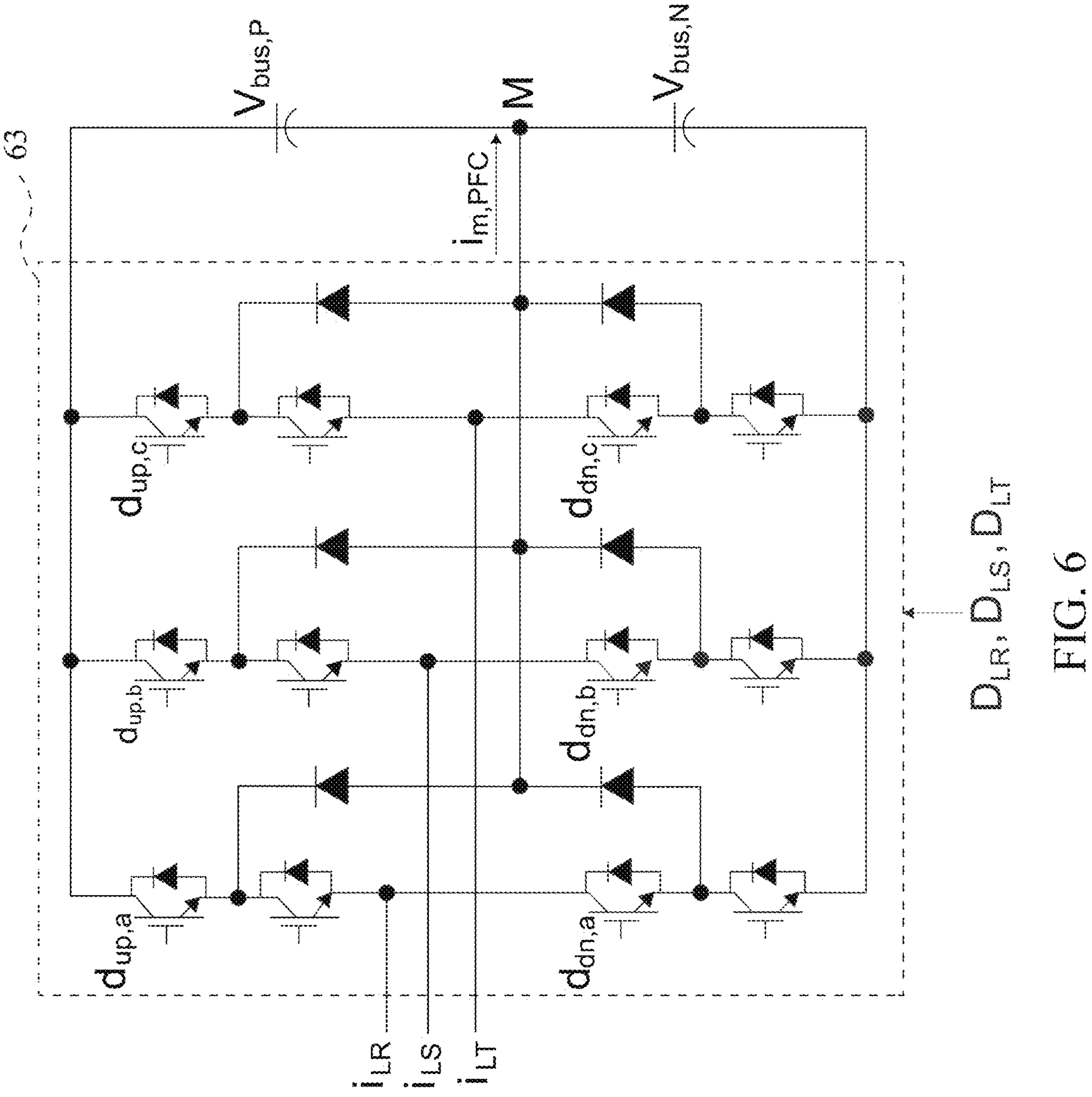
FIG. 6 is a schematic circuit diagram of an I-type neutral-point-clamping power factor corrector of a three-phase power conversion system.

In one embodiment, the power factor corrector 13 of FIG. 1 can be implemented by using an I-type neutral-point-clamping architecture, such as the power factor corrector 63 shown in FIG. 6. For illustrative purposes, a circuit is simplified, and not all components of the power factor corrector 63 are shown in FIG. 6. The power factor corrector 63 is configured to generate an output current $i_{m,PFC}$ according to the input currents $i_{LR}$, $i_{LS}$, and $i_{LT}$ and the plurality of switching commands $D_{LR}$, $D_{LS}$, and $D_{LT}$ to charge the two bus capacitors to adjust the positive bus voltage $V_{bus,P}$ and the negative bus voltage $V_{bus,N}$. Regarding a theoretical mathematical model of the output current $i_{m,PFC}$ of the power factor corrector 63, please refer to the relevant description of FIG. 4 mentioned as above, which is not be described again here.

Figure 7:
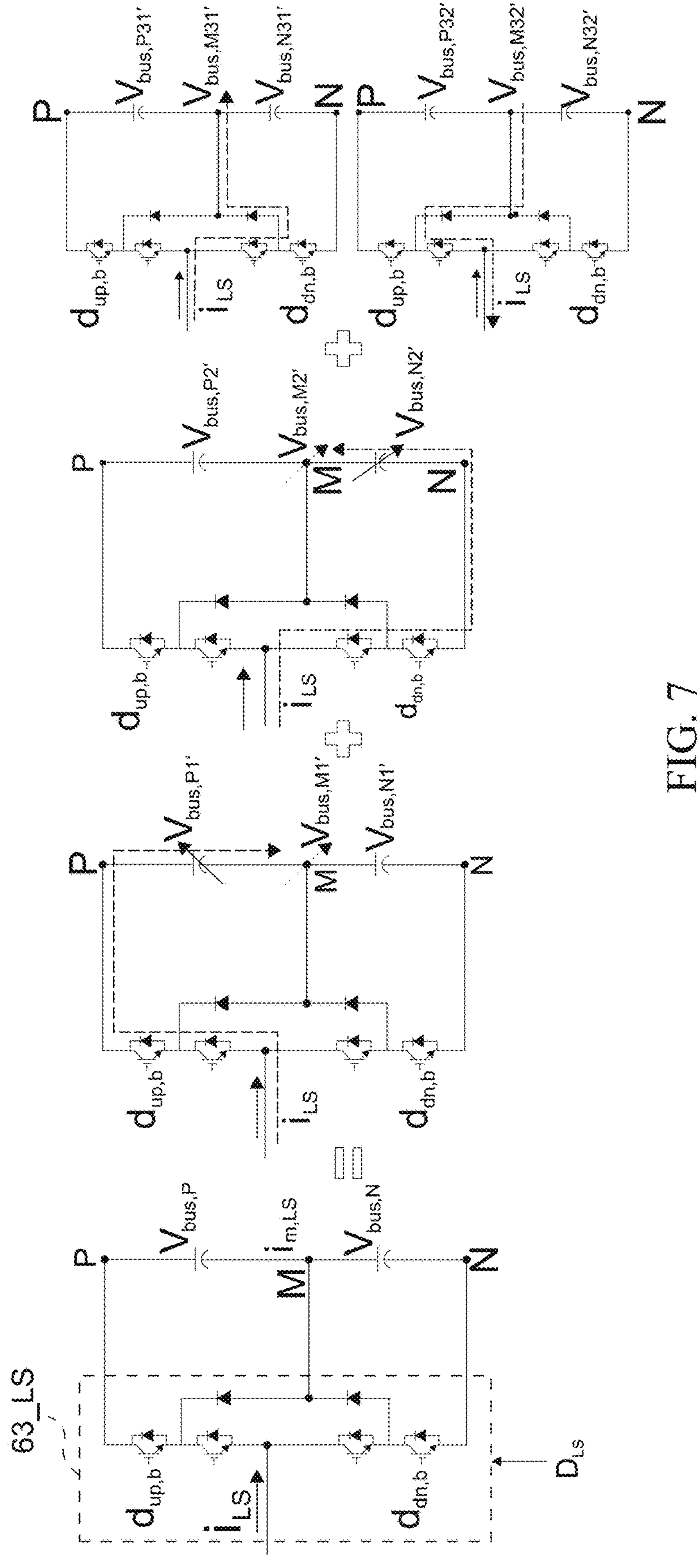
FIG. 7 is a schematic diagram illustrating circuit operations of the I-type neutral-point-clamping power factor corrector shown in FIG. 6.

FIG. 7 is a schematic diagram illustrating circuit operations of the I-type neutral-point-clamping power factor corrector shown in FIG. 6. Here, only the operation of the power factor corrector 63_LS for one phase (e.g., the S-phase electric power) is taken as an example, and the operation of the power factor corrector 63 for the other phases (i.e., the R-phase and T-phase electric power) can be deduced in the same way. The power factor corrector 63_LS is configured to operate in four operating states according to the switching command $D_{LS}$, wherein the switching command $D_{LS}$ is used to control the on and off states of the plurality of switches to generate the output current $i_{m,LS}$. In a first operation state, the input current $i_{LS}$ flows to the positive terminal P through the positive half-cycle path, causing the positive bus voltage $V_{bus,P1'}$ to rise and the negative bus voltage $V_{bus,N1'}$ to remain the same. In the case of the total voltage remaining the same, the terminal voltage $V_{bus,M1'}$ of the neutral terminal M drops. In a second operation state, the input current $i_{LS}$ flows to the negative terminal N through the negative half-cycle path, causing the negative bus voltage $V_{bus,N2'}$ to drop and the positive bus voltage $V_{bus,P2'}$ to remain the same. In the case of the total voltage remaining the same, the terminal voltage $V_{bus,M2'}$ of the neutral terminal M drops. In a third operation state, the input current $i_{LS}$ flows to the neutral terminal M through a first intermediate path of lower-arm switches, because the input current $i_{LS}$ does not go through the bus capacitors, the positive bus voltage $V_{bus,P31'}$ and the negative bus voltage $V_{bus,N31'}$ do not increase or decrease. In the case of the total voltage remaining the same, the terminal voltage $V_{bus,M31'}$ of the neutral terminal M remains at a specific value. Similarly, in a fourth operation state, the input current $i_{LS}$ flows to the neutral terminal M through a second intermediate path of upper-arm switches, because the input current $i_{LS}$ does not go through the bus capacitors, the positive bus voltage $V_{bus,P32'}$ and the negative bus voltage $V_{bus,N32'}$ do not increase or decrease. In the case of the total voltage remaining the same, the terminal voltage $V_{bus,M32'}$ of the neutral terminal M remains at a specific value. Therefore, by using the switching command $D_{LS}$, the bus voltage and the terminal voltage of the neutral terminal M can be effectively adjusted to balance the negative bus voltage and suppress the circular current.

It should be understood that regardless of whether the power factor corrector 13 in FIG. 1 is implemented with an I-type or T-type neutral point clamping architecture, the switch control device 11 can generate the plurality of switching commands $D_{LR}$, $D_{LS}$, and $D_{LT}$ according to equations (4-a), (4-b), and (4-c) to balance the negative bus voltage $V_{bus,N}$ to suppress circular current.

Figure 8:
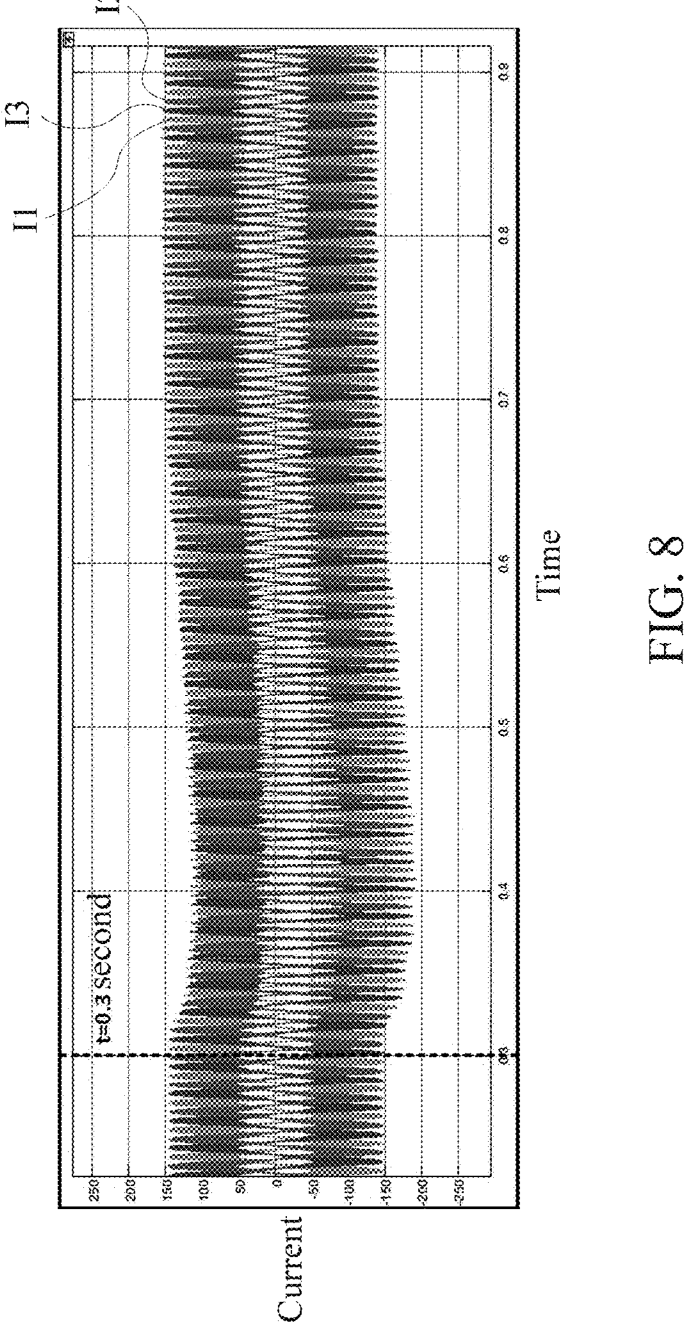
FIG. 8 is a diagram illustrating a current waveform of the switch control device, shown in FIG. 1, in a process of performing circular current suppression.
Figure 9:
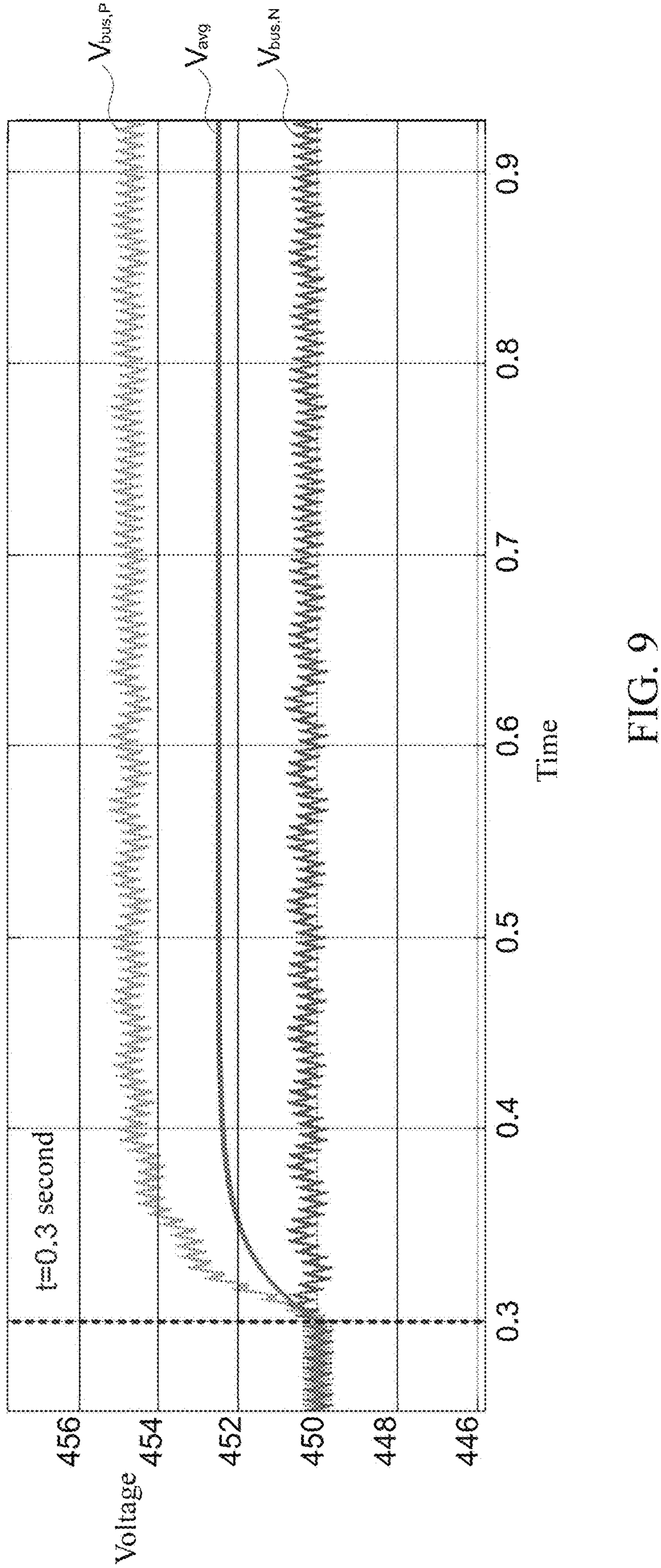
FIG. 9 is a diagram illustrating a bus voltage waveform of the switch control device shown in FIG. 1, in a process of performing circular current suppression.

FIGS. 8 and 9 are diagrams illustrating current and bus voltage waveforms of the switch control device in FIG. 1 in a process of performing circular current suppression. As shown in FIG. 8, inductor currents I1, I2, and I3 taken out from the power factor corrector 13 correspond to the three-phase electric power (such as R, S, and T phases), respectively. Before a moment (such as t=0.3 second), the magnitudes of the inductor currents I1, I2, and I3 comply with preset values; however, at the moment (i.e., t=0.3 second), the total voltage of the power conversion module 12 rises (such as 5 volts) to generate the circular current, resulting in the magnitude of the inductor currents I1, I2, and I3 to drop. After the operation of the switch control device 11, at another moment (such as t=0.4 second), the inductor currents I1, I2, and I3 gradually rise until the magnitudes of the inductor currents I1, I2, and I3 return to the preset values. As shown in FIG. 9, before the moment (i.e., t=0.3 second), magnitudes of the positive bus voltage $V_{bus,P}$ and the negative bus voltage $V_{bus,N}$ are the same (such as 450 volts, the total voltage is 900 volts); however, at the moment (i.e., t=0.3 second), the total voltage rises (e.g., from 900 volts to 905 volts), resulting in generating the circular current. After the operation of the switch control device 11, the positive bus voltage $V_{bus,P}$ is increased by 5 volts, and the negative bus voltage $V_{bus,N}$ remains the same, an average voltage $V_{avg}$ between the two bus voltages is approximately 452.5 volts, which can balance the bus voltage $V_{bus,N}$ of each power conversion module 12 at the negative terminal N to achieve the effect of circular current suppression at the same time.

Figure 10:
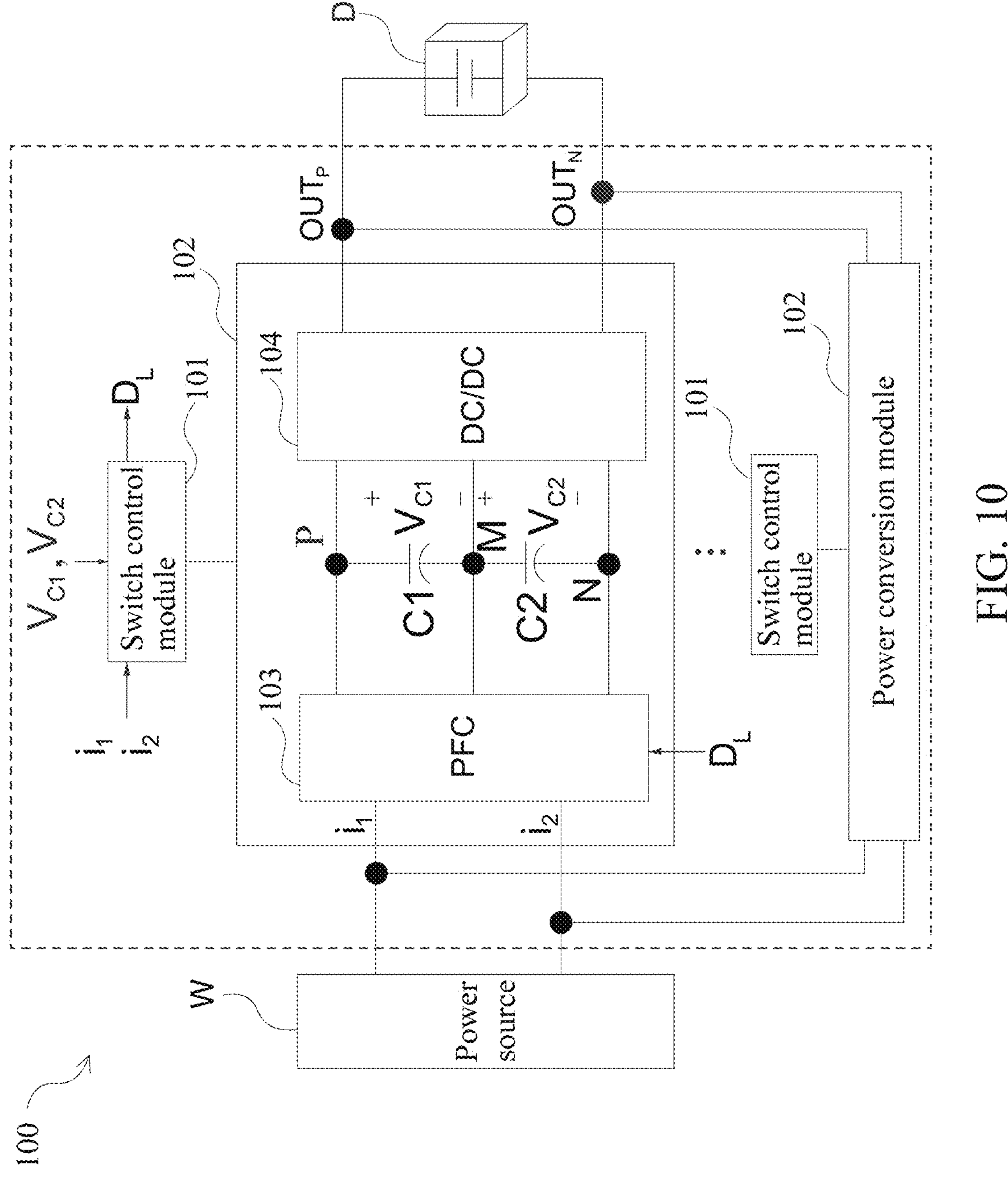
FIG. 10 is a schematic diagram of a single-phase power conversion system with a multi-module parallel topology according to a second embodiment of the present disclosure.

FIG. 10 is a schematic diagram of a single-phase power conversion system 100 with a multi-module parallel topology according to a second embodiment of the present disclosure. The single-phase power conversion system 100 is configured to convert single-phase AC input power into DC output power and adopts a multi-module parallel topology to increase the power conversion capacity of the system. However, because a negative output terminal $OUT_N$ of each module is directly connected to a negative terminal N of a DC bus, when the negative bus voltage $V_{C2}$ of each module is different, a DC circular current will be generated.

Structurally, the single-phase power conversion system 100 includes a power source W, a plurality of switch control devices 101, a plurality of power conversion modules 102, and a load D, wherein the numbers of the switch control devices 101 and the power conversion modules 102 are the same. The power source W is a single-phase AC power source, and the load D is, for example, a DC battery or a DC load. The plurality of power conversion modules 102 are connected in parallel, and each power conversion module 102 is configured to convert single-phase AC power into DC power. The plurality of switching control devices 101 are connected to the plurality of power conversion modules 102, respectively. Each switching control device 101 is configured to generate a switching command $D_L$ according to the input currents $i_1$ and $i_2$, the positive bus voltage $V_{C1}$, and the negative bus voltage $V_{C2}$. It should be noted that assuming there are k identical power conversion modules 102, the total input currents $i_{1,total}$ and $i_{2,total}$ provided by the power source W are a sum of the input currents input to the k power conversion modules 102 and can be expressed as the following equations:

$$i_{1,total} = i_{1,1} + \ldots + i_{1,k};$$

$$i_{2,total} = i_{2,1} + \ldots + i_{2,k},$$

wherein k is a natural number.

Each power conversion module 102 includes a power factor corrector (PFC) 103, a positive bus capacitor C1, a negative bus capacitor C2, and a direct current converter (DC/DC) 104. The power factor corrector 103 is connected to the power source W and is configured to convert the input currents $i_1$ and $i_2$ into a positive bus voltage $V_{C1}$ and a negative bus voltage $V_{C2}$ according to a switching command $D_L$. The power factor corrector 103 and the DC converter 104 are connected through three buses, wherein the three buses correspond to the positive terminal P, the neutral terminal M, and the negative terminal N, respectively. The positive bus capacitor C1 and the negative bus capacitor C2 are connected in series with each other. A positive electrode of the positive bus capacitor C1 is connected to the positive terminal P, a negative electrode of the positive bus capacitor C1 is connected to the neutral terminal M, and a voltage across the positive bus capacitor C1 is the positive bus voltage $V_{C1}$. A positive electrode of the negative bus capacitor C2 is connected to the neutral terminal M, a negative electrode of the negative bus capacitor C2 is connected to the negative terminal N, and a voltage across the negative bus capacitor C2 is the negative bus voltage $V_{C2}$. The DC converter 104 is connected to the power factor corrector 103, the positive bus capacitor C1, and the negative bus capacitor C2 and is configured to convert the positive bus voltage $V_{C1}$ and the negative bus voltage $V_{C2}$ into voltages output to the positive output terminal $OUT_P$ and the negative output terminal $OUT_N$. In some embodiments, the power factor corrector 103 can be, for example, an active or passive power factor correction circuit configured to rectify and perform power factor correction on the power source W. In some embodiments, the DC converter 104 can be in form of, for example, forward type, flyback type, transformerless or having a transformer.

In operation, when circular current is detected, each switch control device 101 is configured to generate a switching command $D_L$ to the power factor corrector 103 according to the input currents $i_1$ and $i_2$ and the positive bus voltage $V_{C1}$ and the negative bus voltage $V_{C2}$. Each power factor corrector 103 adjusts at least one of the positive bus voltage $V_{C1}$ and the negative bus voltage $V_{C2}$ to suppress circular current according to the switching command $D_L$. In this way, through the operation of the switch control device 101, a voltage difference of the negative bus voltage $V_{C2}$ of each power conversion module 102 will be zero, which can effectively suppress the circular current in the single-phase power conversion system 100.

Figure 11:
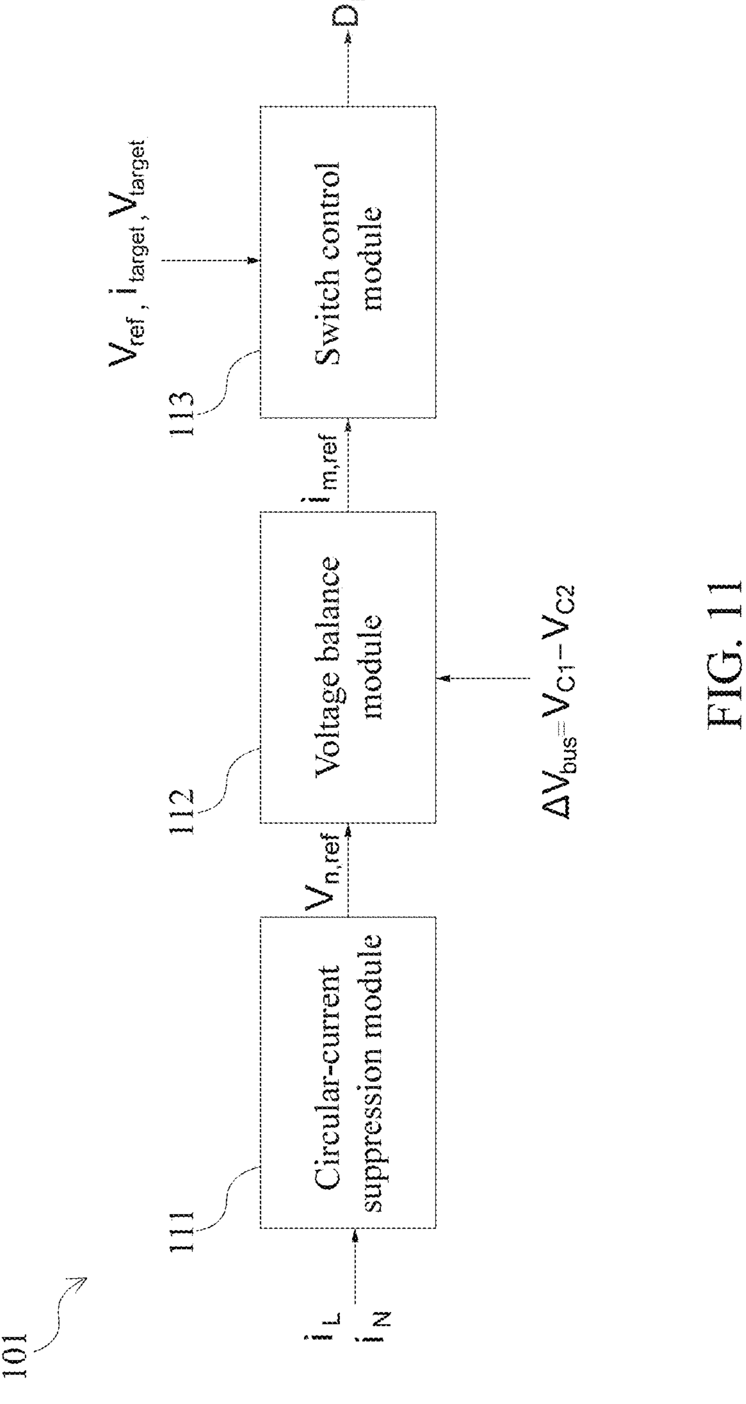
FIG. 11 is a functional-block diagram of the switch control device shown in FIG. 10.

FIG. 11 is a functional-block diagram of the switch control device shown in FIG. 10. The switch control device 101 includes a circular-current suppression module 111, a voltage balance module 112, and a switch control module 113. Structurally, the circular-current suppression module 111 is connected to the power source W (not shown in FIG. 11, please refer to FIG. 10) and is configured to generate a first reference voltage $V_{n,ref}$ according to the input currents $i_L$ and $i_N$, wherein the input currents $i_L$ and $i_N$ correspond to the input currents $i_1$ and $i_2$ in FIG. 10, respectively. The voltage balance module 112 is connected to the circular-current suppression module 111 and is configured to generate a first reference current $i_{m,ref}$ according to the first reference voltage $V_{n,ref}$ and a bus-voltage difference $\Delta V_{bus}$, wherein the bus-voltage difference $\Delta V_{bus}=V_{C1}-V_{C2}$. The switch control module 113 is connected to the voltage balance module 112 and is configured to generate a switching command $D_L$ according to the first reference current $i_{m,ref}$. In some embodiments, a target current $i_{target}$ and a target voltage $V_{target}$ can be preset and stored in a memory or can be adjusted in real time and come from a user input interface.

In operation, the circular-current suppression module 111 first calculates the circular current corresponding to the input currents $i_L$ and $i_N$ and converts it into the first reference voltage $V_{n,ref}$. Next, the voltage balance module 112 calculates a difference between the first reference voltage $V_{n,ref}$ and the bus-voltage difference $\Delta V_{bus}$ based on the first reference voltage $V_{n,ref}$ and converts it into the first reference current $i_{m,ref}$. Finally, the switch control module 113 generates a switching command $D_L$ to the power factor corrector 103 according to the first reference current $i_{m,ref}$. After several switch control operations, the switch control device 101 can converge the circular current to the target current $i_{target}$ (e.g., zero ampere) and converge the bus-voltage difference $\Delta V_{bus}$ to the target voltage $V_{target}$ (e.g., zero volts), thereby achieving the effect of suppressing the circular current.

Figure 12:
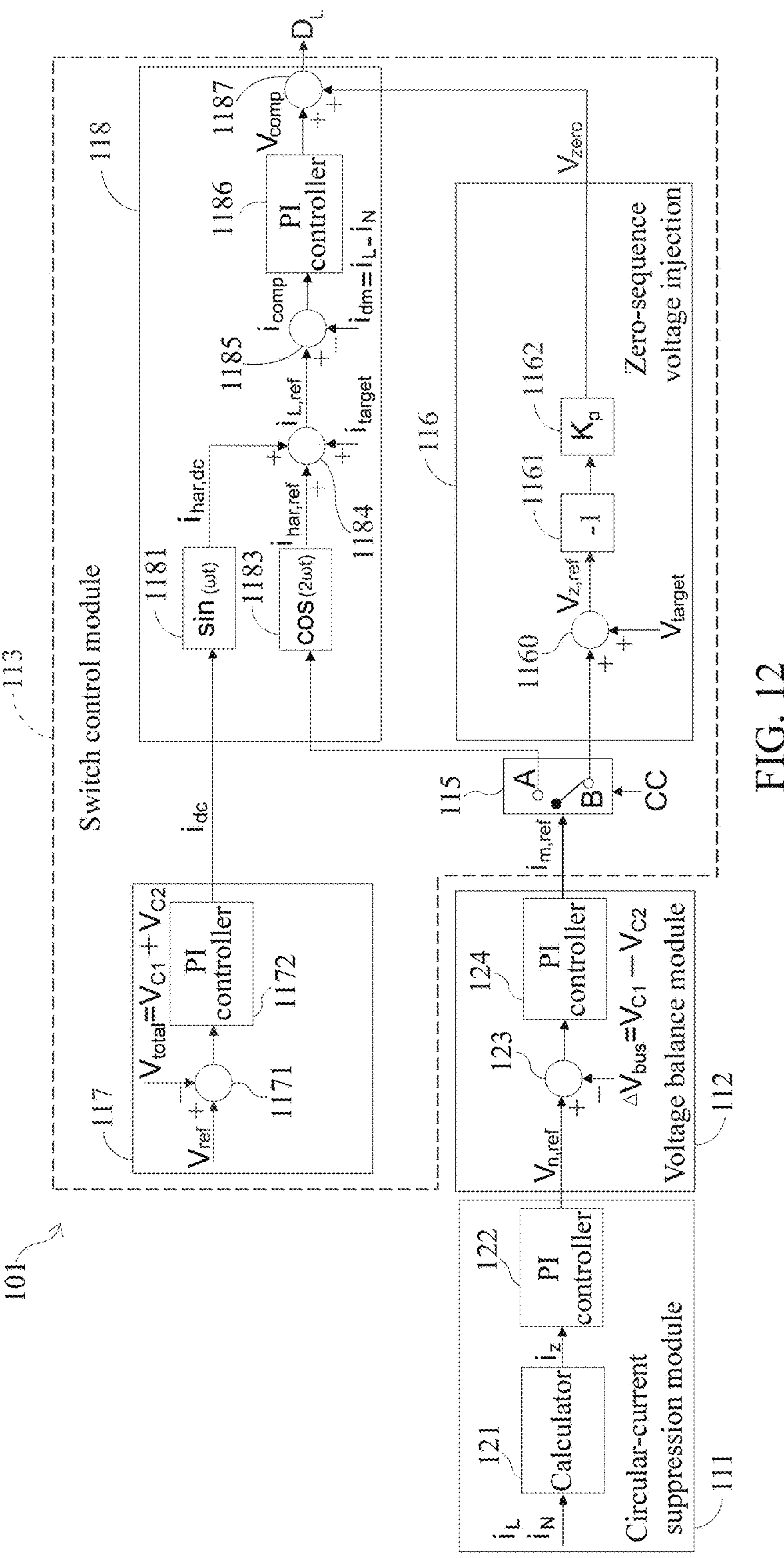
FIG. 12 is a detailed functional-block diagram of the switch control device shown in FIG. 11.

FIG. 12 is a detailed functional-block diagram of the switch control device 101 shown in FIG. 11. The circular-current suppression module 111 includes a calculator 121 and a proportional-integral (PI) controller 122. The calculator 121 is connected to the power source W (not shown in FIG. 12, please refer to FIG. 11) and is configured to calculate a common-mode current $i_z$ according to the following equation (1'):

$$i_z = \frac{i_L + i_N}{2} \quad (1')$$

It should be understood that $i_L$ is one live-wire current among the plurality of input currents, $i_N$ is a neutral-current among the plurality of input currents, when an average value of the input current $i_L$ and $i_N$ at any moment is zero, the common-mode current $i_z$ is zero, indicating that there is no circular current in the single-phase power conversion system 100 of FIG. 10. Therefore, the calculator 121 is configured to calculate the average value of the input currents $i_L$ and $i_N$ to calculate the common-mode current $i_z$ to detect the circular current. The PI controller 122 is connected to the calculator 121 and is configured to convert the common-mode current $i_z$ to the first reference voltage $V_{n,ref}$.

The voltage balance module 112 includes a subtractor 123 and a PI controller 124. The subtractor 123 is connected to the PI controller 122 of the circular-current suppression module 111 and is configured to subtract the bus-voltage difference $\Delta V_{bus}$ from the first reference voltage $V_{n,ref}$ to generate a difference. The PI controller 124 is connected to the subtractor 123 and is configured to convert the difference between the first reference voltage $V_{n,ref}$ and the bus-voltage difference $\Delta V_{bus}$ into the first reference current $i_{m,ref}$.

The switch control module 113 includes a selector 115, a zero-sequence voltage injection module 116, a total DC voltage module 117, and a current control module 118. The selector 115 is connected to the PI controller 124 of the voltage balance module 112 and is configured to output the first reference current $i_{m,ref}$ to the zero-sequence voltage injection module 116 or the current control module 118 according to a control command CC. The zero-sequence voltage injection module 116 is connected to the selector 115 and is configured to generate a zero-sequence voltage $V_{zero}$ according to the first reference current $i_{m,ref}$. The total DC voltage module 117 is configured to generate a total DC current $i_{dc}$ according to the second reference voltage $V_{ref}$ and the total voltage $V_{total}=V_{C1}+V_{C2}$. The current control module 118 is connected to the total DC voltage module 117, the selector 115, and the zero-sequence voltage injection module 116 and is configured to generate the switching command DL according to the total DC current $i_{dc}$, the input currents $i_L$ and $i_N$, and the first reference current $i_{m,ref}$ or according to the zero-sequence voltage $V_{zero}$. For example, in a harmonic current control mode, the selector 115 outputs the first reference current $i_{m,ref}$ to the current control module 118, such that the current control module 118 generates the switching command $D_L$ according to the first reference current $i_{m,ref}$; in another aspect, in a zero-sequence voltage injection mode, the selector 115 outputs the first reference current $i_{m,ref}$ to the zero-sequence voltage injection module 116, such that the current control module 118 generate the switching command $D_L$ according to the zero-sequence voltage $V_{zero}$.

In detail, the zero-sequence voltage injection module 116 includes an adder 1160, an inverter 1161, and a gain amplifier 1162. The adder 1160 is connected to the selector 115 and is configured to calculate a sum of a voltage corresponding to the first reference current $i_{m,ref}$ and the target voltage $V_{target}$ (e.g., zero) to generate the third reference voltage $V_{z,ref}$. In one embodiment, when the first reference current $i_{m,ref}$ is a positive value, the adder 1160 can be replaced by a subtractor to converge the voltage corresponding to the first reference current $i_{m,ref}$ to the target voltage $V_{target}$. An inverter 1161 is connected to the adder 1160 and is configured to invert (multiply by −1) the third reference voltage $V_{z,ref}$. The gain amplifier 1162 is connected to the inverter 1161 and is configured to multiply the third reference voltage $V_{z,ref}$ that has further inverted by a coefficient ($K_p$) to generate the zero-sequence voltage $V_{zero}$, wherein the coefficient $K_p$ can be anyone real number.

The total DC voltage module 117 includes a subtractor 1171 and a PI controller 1172. The subtractor 1171 is configured to subtract the total voltage $V_{total}$ from the second reference voltage $V_{ref}$. The PI controller 1172 is connected to the subtractor 1171 and is configured to convert a difference between the second reference voltage $V_{ref}$ and the total voltage $V_{total}$ into a total direct current $i_{dc}$.

The current control module 118 is configured to generate switching command $D_L$. The current control module 118 includes a sine function generator 1181, a cosine function generator 1183, an adder 1184, a subtractor 1185, a PI controller 1186, and an adder 1187.

The sine function generator 1181 is connected to the total DC voltage module 117 and is configured to extract the sine integer-harmonic component $i_{har,dc}$ of the total DC current $i_{dc}$, wherein the angular frequency of the sine integer harmonics is ω. The cosine function generator 1183 is connected to the selector 115 and is configured to extract the cosine even-numbered harmonic components $i_{har,ref}$ of the first reference current $i_{m,ref}$, wherein the angular frequency of the even-numbered harmonics is (E*2*ω), and E is a natural number. The adder 1184 is connected to the sine function generator 1181 and the cosine function generator 1183 and is configured to add the target current $i_{target}$, the sine integer-harmonic component $i_{har,dc}$, and the cosine even-numbered harmonic components $i_{har,ref}$ to generate a second reference current $i_{L,ref}$. In this embodiment, the magnitude of the target current $i_{target}$ is zero to instruct the current control module 118 to converge the first reference current $i_{m,ref}$ until it is converged to zero; in other embodiments, according to actual application requirements, the magnitude of the target current $i_{target}$ is a tolerance value that is not zero. The subtractor 1185 is connected to the adder 1184 and is configured to subtract a differential-mode current $i_{dm}=i_L-i_N$ from the second reference current $i_{L,ref}$ to generate a compensation current $i_{comp}$. The PI controller 1186 is connected to the subtractor 1185 and is configured to convert the compensation current $i_{comp}$ into a compensation voltage $V_{comp}$. The adder 1187 is connected to the PI controller 1186 and is configured to add the compensation voltage $V_{comp}$ and the zero-sequence voltage $V_{zero}$ to generate the switching command $D_L$.

Figure 13:
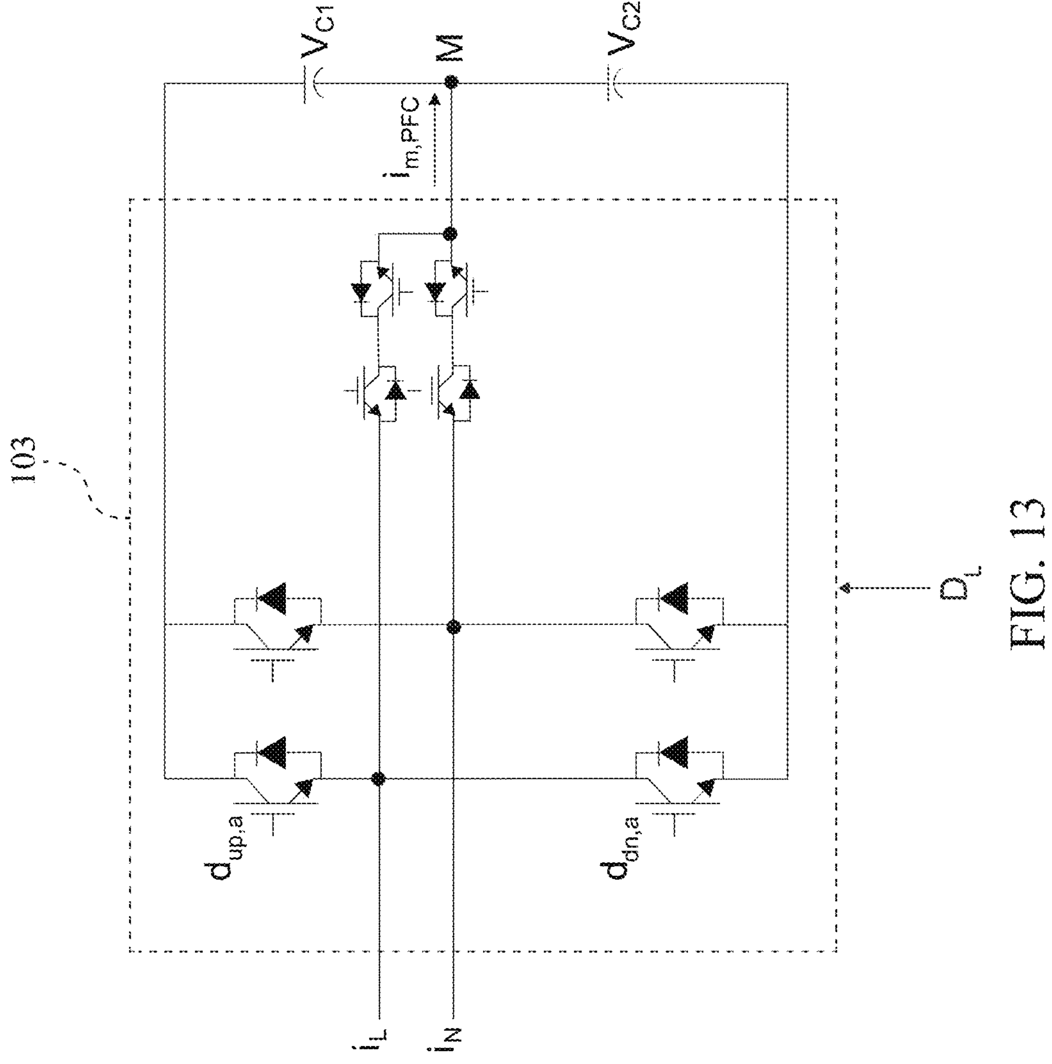
FIG. 13 is a schematic circuit diagram of a T-type neutral-point-clamping power factor corrector of a single-phase power conversion system.

In one embodiment, the power factor corrector 103 may be implemented by using a T-type neutral-point-clamping architecture, as shown in FIG. 13. For illustrative purposes, a circuit is simplified, and not all components of the power factor corrector 103 are shown in FIG. 13. The power factor corrector 103 is configured to generate an output current $i_{m,PFC}$ according to the input currents $i_L$ and $i_N$ and the switching command $D_L$ to charge the two bus capacitors to adjust the positive bus voltage $V_{C1}$ and the negative bus voltage $V_{C2}$. It should be noted that in order to suppress the circular current and balance the negative bus voltage $V_{C2}$, the power factor corrector 103 can be adopted to inject active current or zero-sequence voltage into at least one of the positive bus capacitor C1 and the negative bus capacitor C2 (as shown in FIG. 10), thereby adjusting at least one of the positive bus voltage $V_{C1}$ and the negative bus voltage $V_{C2}$.

For example, the output current $i_{m,PFC}$ of the power factor corrector 103 can be expressed as the following equation (2')

$$i_{m,PFC}=i_a d_{up,a}+i_a d_{dn,a} \tag{2'}$$

wherein $i_a d_{up,a}$ is the current in the positive-half cycle; $i_a d_{dn,a}$ is the current in the negative-half cycle; $i_a$ is the current components associated with the live-wire current; $d_{up,a}$ is the switching control function of the positive-half cycle; and $d_{dn,a}$ is the switching control function of the negative-half cycle.

Furthermore, if the positive and negative half-cycle currents in equation (2') are integrated together, the output current $i_{m,PFC}$ of the power factor corrector 103 can be rewritten as the following equation (3'):

$$i_{m,PFC} = i_a |d_a| \tag{3'}$$

wherein $|d_a|$ is the switching control function associated with a full cycle of live-wire current. The power factor corrector 103 generates a duty-period signal group for turning on and off a switch group according to the plurality of switching control functions $|d_a|$ to adjust the output current im,PFC. Therefore, the switching command $D_L$ indicates the plurality of switch control functions $|d_a|$.

It should be noted that, in order to have the output current $i_{m,PFC}$ to generate effective power (i.e., actual power) on the two bus capacitors, the output current $i_{m,PFC}$ of the power factor corrector 103 injects the cosine even-numbered-harmonic components of the input current $i_L$ into at least one of the two bus capacitances, the switch control function $|d_a|$ can be expressed as the following equation (4-a'):

$$|d_a| = \frac{2}{\pi}A - \frac{4A}{\pi}\left(\frac{1}{3}\cos(2\omega t) + \frac{1}{15}\cos(4\omega t) + \ldots\right) \tag{4-a'}$$

Therefore, by injecting currents with cosine even-numbered harmonics (such as 2, 4, and . . . numbered harmonics) to the power factor corrector 103, which can adjust at least one of the positive bus voltage $V_{bus,P}$ and the negative bus capacitance $V_{bus,N}$ without changing a circuit architecture of the power factor corrector 103 and the power conversion module 102 to suppress circular current.

Figure 14:
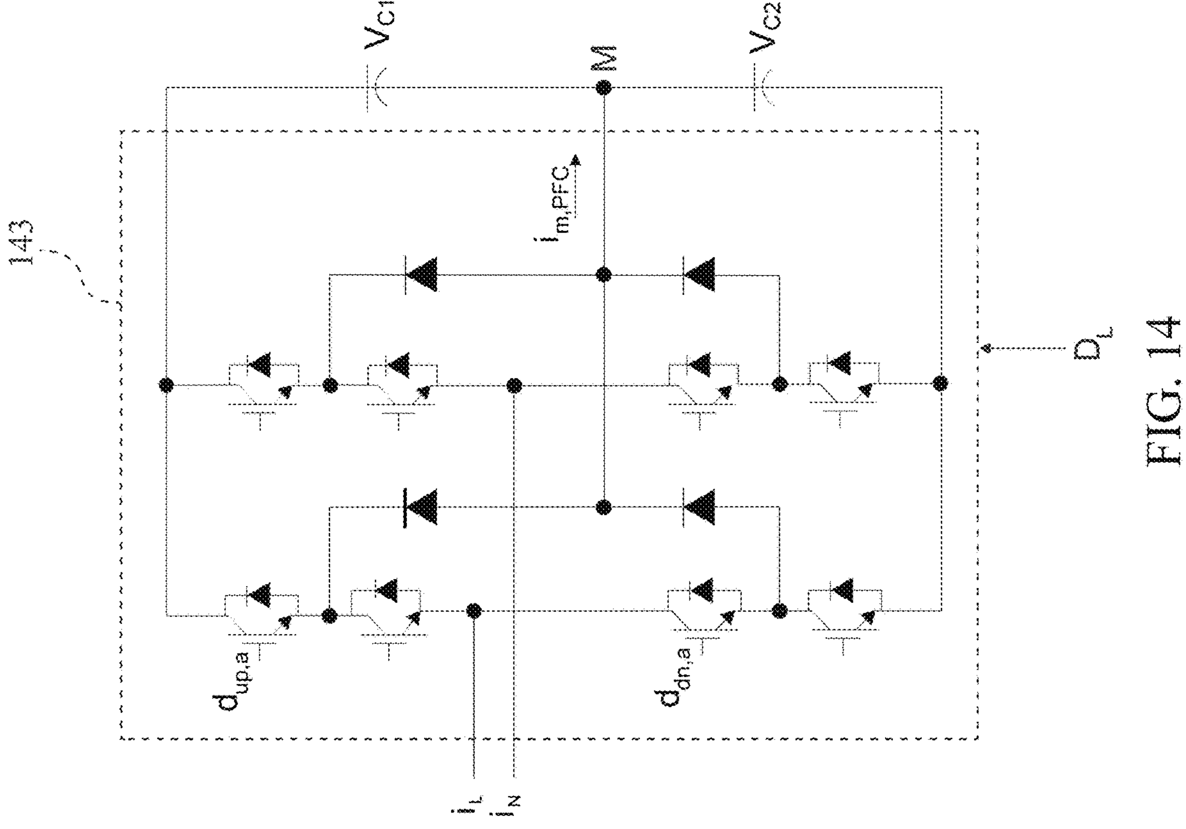
FIG. 14 is a schematic circuit diagram of an I-type neutral-point-clamping power factor corrector of a single-phase power conversion system.

In one embodiment, the power factor corrector 103 of FIG. 10 can be implemented by using an I-type neutral-point-clamping architecture, such as a power factor corrector 143 shown in FIG. 14. For illustrative purposes, a circuit is simplified, and not all components of the power factor corrector 143 are shown in FIG. 14. The power factor corrector 143 is configured to generate an output current $i_{m,PFC}$ according to the input currents $i_L$ and $i_N$ and a switching command $D_L$ to charge the two bus capacitors to adjust the positive bus voltage $V_{C1}$ and the negative bus capacitance $V_{C2}$. Regarding the theoretical mathematical model of the output current $i_{m,PFC}$ of the power factor corrector 103, please refer to the relevant description of FIG. 13 mentioned as above, and will not be described again here.

It should be understood that regardless of whether the power factor corrector 103 in FIG. 10 is implemented with an I-type or T-type neutral-point-clamping architecture, the switching control device 101 can generate the switching command $D_L$ according to function (4-a') to balance the negative bus voltage $V_{bus,N}$ to suppress circular current.

Figure 15:
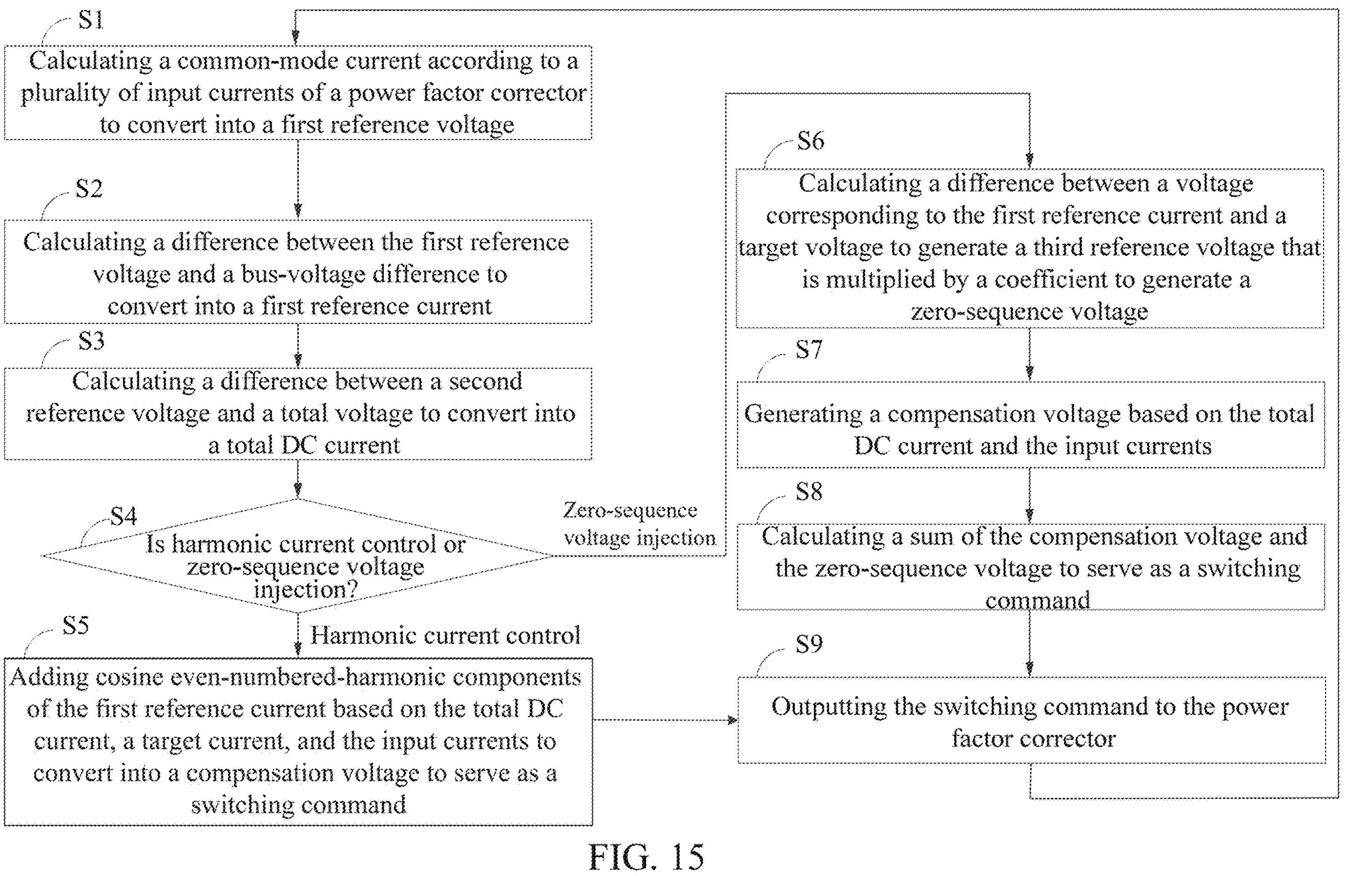
FIG. 15 is a schematic diagram illustrating a flowchart of a circular current suppression method according to an embodiment of the present disclosure.

FIG. 15 is a schematic diagram illustrating a flowchart of a circular current suppression method according to an embodiment of the present disclosure. The circular current suppression method can be used in the first embodiment (i.e., the three-phase power conversion system 10 of FIG. 1) and the second embodiment (i.e., the single-phase power conversion system 100 of FIG. 10). The circular current suppression method can be compiled into a program code and stored in a built-in memory of the power conversion system 10 or 100 and configured to instruct the switch control device 11 or 101 to perform the following steps.

Step S1: calculating a common-mode current according to a plurality of input currents to convert into a first reference voltage.

Step S2: calculating a difference between the first reference voltage and a bus-voltage difference to convert into a first reference current.

Step S3: calculating a difference between a second reference voltage and a total voltage to convert into a total DC current.

Step S4: determining whether a harmonic current control mode or a zero-sequence voltage injection mode is performed. If the harmonic current control mode is performed, proceed to step S5; if the zero-sequence voltage injection mode is performed, then proceed to step S6.

Step S5: adding the cosine even-numbered harmonic components of the first reference current based on the total DC current, the target current, and the input currents to convert into a compensation voltage to serve as a switching command. Then, proceed to step S9.

Step S6: calculating a difference between a voltage corresponding to the first reference current and a target voltage to multiply the difference by a coefficient to generate a zero sequence voltage.

Step S7: generating a compensation voltage based on the total DC current and the input currents.

Step S8: calculating a sum of the compensation voltage and the zero-sequence voltage to serve as a switching command.

Step S9: outputting the switching command to the power factor corrector. Then, returning to step S1. It should be understood that the circular current suppression method terminates execution when a termination condition is met, such as when the power conversion system terminates operations.

Taking a three-phase architecture as an example, for the three-phase power conversion system 10 of FIG. 1, in step S1, the circular-current suppression module 21 calculates the common-mode current $i_z$ according to the plurality of input currents $i_{LR}$, $i_{LS}$, and $i_{LT}$ to convert into the first reference voltage $V_{m,ref}$. In step S2, the voltage balance module 22 calculates the difference between the first reference voltage $V_{m,ref}$ and the bus-voltage difference $\Delta V_{bus}$ to convert into the first reference current $i_{m,ref}$, wherein $\Delta V_{bus} = V_{bus,P} - V_{bus,N}$. In step S3, the total DC voltage module 37 calculates the difference between the second reference voltage $V_{ref}$ and the total voltage $V_{total}$ to convert into the total DC current $i_{dc}$. In step S4, the selector 35 determines whether the harmonic current control mode or the zero-sequence voltage injection mode is performed according to the control command CC.

In step S5, in the harmonic current control mode, the current control module 38 adds the cosine even-numbered harmonic components $i_{har,ref}$ of the first reference current $i_{m,ref}$ based on the total DC current $i_{dc}$, the target current $i_{target}$, and the input currents (e.g., one of $i_{LR}$, $i_{LS}$, and $i_{LT}$) to convert into the compensation voltage $V_{comp}$ to serve as the switching command (e.g., one of $D_{LR}$, $D_{LS}$ and $D_{LT}$). In detail, the current control module 38 extracts the sine integer-harmonic component $i_{har,dc}$ of the total direct current $i_{dc}$, extracts the cosine even-numbered harmonic components $i_{har,ref}$ of the first reference current $i_{m,ref}$, calculates the sum of the target current $i_{target}$, the sine integer-harmonic component $i_{har,dc}$, and the cosine even-numbered harmonic components $i_{har,ref}$ to generate the second reference current (such as one of $i_{LR,ref}$, $i_{LS,ref}$, and $i_{LT,ref}$), calculates the difference between the second reference current and the input currents (such as $i_{LR}$, $i_{LS}$, and $i_{LT}$) to generate the compensation current $i_{comp}$, and converts the compensation current $i_{comp}$ into the compensation voltage $V_{comp}$ to serve as a switching command (such as one of $D_{LR}$, $D_{LS}$, and $D_{LT}$). It should be noted that in the harmonic current control mode, the selector 35 inputs the first reference current $i_{m,ref}$ to the current control module 38, and the compensation voltage $V_{comp}$ includes the sine integer-harmonic component $i_{har,dc}$ of the total direct current ide and the cosine even-numbered harmonic components $i_{har,ref}$ of the first reference current $i_{m,ref}$.

In step S6, in the zero-sequence voltage injection mode, the zero-sequence voltage injection module 36 calculates the difference between the voltage corresponding to the first reference current $i_{m,ref}$ and the target voltage $V_{target}$ and multiplies the difference by a coefficient ($-K_p$) to generate the zero-sequence voltage $V_{zero}$, wherein the coefficient $K_p$ can be any real number. In step S7, the current control module 38 generates the compensation voltage $V_{comp}$ based on the total DC current ide and the input current (such as one of $i_{LR}$, $i_{LS}$, and $i_{LT}$). In detail, the current control module 38 extracts the sine integer-harmonic component $i_{har,dc}$ of the total direct current $i_{dc}$, calculates the sum of the target current $i_{target}$, the sine integer-harmonic component $i_{har,dc}$, and the cosine even-numbered harmonic components $i_{har,ref}$ to generate the second reference current (such as one of $i_{LR,ref}$, $i_{LS,ref}$, and $i_{LT,ref}$), calculates the second reference current and the input currents (such as one of $i_{LR}$, $i_{LS}$, and $i_{LT}$) to generate the compensation current $i_{comp}$, and converts the compensation current $i_{comp}$ into the compensation voltage $V_{comp}$. In step S8, the current control module 38 calculates the sum of the compensation voltage $V_{comp}$ and the zero-sequence voltage $V_{zero}$ to serve as the switching command (such as one of $D_{LR}$, $D_{LS}$, and $D_{LT}$). It should be noted that in the zero-sequence voltage injection mode, the selector 35 inputs the first reference current $i_{m,ref}$ to the zero-sequence voltage injection module 36, such the compensation voltage $V_{comp}$ only includes the sine integer-harmonic component $i_{har,dc}$ of the total direct current $i_{dc}$.

Finally, in step S9, in the harmonic current control mode and zero sequence voltage injection mode, the current control module 38 outputs switching commands (such as one of $D_{LR}$, $D_{LS}$, and $D_{LT}$) to the power factor corrector 13.

It should be understood that for the three-phase power conversion system 10 of FIG. 1, the switch control device 11 performs a circular current suppression method to output a switching command (such as one of $D_{LR}$, $D_{LS}$, and $D_{LT}$) to the power factor corrector 13. For details about the circular current suppression method performed by the switch control device 11, please refer to the relevant descriptions in FIGS. 1 to 9, and will not be described again here. Similarly, for the single-phase power conversion system 100 of FIG. 10, the switching control device 101 performs a circular current suppression method to output a switching command (such as $D_L$) to the power factor corrector 103, for details about the circular current suppression method performed by the switch control device 101, please refer to the relevant descriptions in FIGS. 10 to 14, and will not be described again here.

In some embodiments, the switch control devices 11 and 101 can be configured in a hardware form or a software-and-hardware collaborative operation form as required. In the hardware form, for example, a hardware description language (such as System C or VHDL) can be used to design an application-specific integrated circuit (ASIC). In the software and hardware collaboration form, a programming language (such as C or C++) can be used to cooperate with an electronic device equipped with a processor (such as a central processing unit or a digital signal processor) and a memory, such as an industrial computers (IPC).

In summary, the circular current suppression method, the circular current suppression device, and the power conversion system of the present disclosure can control the power factor corrector to inject active current (i.e., the cosine even-numbered harmonic components or zero-sequence voltage associated with the input currents) into at least one of the positive bus capacitor and the negative bus capacitor, thereby suppressing circular current and balancing the negative bus voltage. In this way, the effect of suppressing circular current and balancing the negative bus voltage can be achieved without changing the circuit architecture.

Although the present disclosure has been disclosed in the preferred embodiments, any person skilled in the art can make various changes and modifications without departing from the spirit and scope of the present disclosure. Therefore, the protection scope of the present disclosure shall be determined by the appended claims.

What is claimed is:

1. A circular current suppression method, applied to a plurality of power conversion modules connected in parallel, each power conversion module comprising a power factor corrector, a positive bus capacitor, and a negative bus capacitor, the power factor corrector adjusting at least one of a positive bus voltage and a negative bus voltage based on at least one switching command, wherein the method comprises:

calculating a common-mode current based on a plurality of input currents of the power factor corrector to convert into a first reference voltage;

calculating a difference between the first reference voltage and a bus-voltage difference to convert into a first reference current, wherein the bus-voltage difference is a difference between the positive bus voltage and the negative bus voltage;

calculating a difference between a second reference voltage and a total voltage to convert into a total DC current, wherein the total voltage is a sum of the positive bus voltage and the negative bus voltage;

adding a plurality of cosine even-numbered-harmonic components of the first reference current based on the total DC current, a target current, and one of the plurality of input currents to calculate a compensation current in a harmonic-current control mode; and converting the compensation current into a compensation voltage to serve as one of at least one switching command and output to the power factor corrector.

2. The circular current suppression method as claimed in claim 1, wherein the plurality of input currents are associated with a three-phase AC power source, according to the plurality of input currents of the power factor corrector, the calculating the common-mode current comprises:

calculating the common-mode current according to a function as the following:

$$i_z = \frac{i_{LR} + i_{LS} + i_{LT}}{3},$$

wherein $i_z$ is the common-mode current, $i_{LR}$, $i_{LS}$, and $i_{LT}$ are the plurality of input currents, and the common-mode current is an average value of the plurality of input currents.

3. The circular current suppression method as claimed in claim 2, wherein in the harmonic-current control mode, the adding the plurality of cosine even-numbered-harmonic components of the first reference current based on the total DC current, a target current, and one of the plurality of input currents to calculate a compensation current comprises:

extracting a sine integer-harmonic component of the total DC current;

extracting the plurality of cosine even-numbered-harmonic components of the first reference current;

calculating a sum of the target current, the sine integer-harmonic component, and the plurality of cosine even-numbered-harmonic components to generate a second reference current; and calculating a difference between the second reference current and one of the input currents to generate the compensation current.

4. The circular current suppression method as claimed in claim 1, further comprises:

in a zero-sequence voltage injection mode, calculating a sum of a voltage corresponding to the first reference current and a target voltage to generate a third reference voltage;

multiplying the third reference voltage by a coefficient to generate a zero-sequence voltage, wherein the coefficient is an arbitrary real number;

generating the compensation voltage based on the total DC current and one of the plurality of input currents; and calculating a sum of the compensation voltage and the zero-sequence voltage to serve as one of the at least one switching command and output to the power factor corrector.

5. The circular current suppression method as claimed in claim 4, wherein the generating the compensation voltage based on the total DC current and one of the plurality of input currents comprises:

extracting a sine integer-harmonic component of the total DC current;

calculating a difference between the sine integer-harmonic component and one of the plurality of input currents to generate the compensation current; and converting the compensation current into the compensation voltage.

6. The circular current suppression method as claimed in claim 1, wherein one of the plurality of input currents is associated with a single-phase AC power source, and the calculating the common-mode current based on the plurality of input currents of the power factor corrector comprises:

calculating the common-mode current according to a function as the following:

$$i_z = \frac{i_L + i_N}{2},$$

wherein $i_z$ is the common mode current, $i_L$ is a live-wire current among the plurality of input currents, $i_N$ is a neutral-wire current among the plurality of input currents, and the common-mode current is an average value of the live-wire current and the neutral-wire current.

7. The circular current suppression method as claimed in claim 6, wherein in the harmonic-current control mode, the adding the plurality of cosine even-numbered-harmonic components of the first reference current based on the total DC current, a target current, and one of the plurality of input currents to calculate a compensation current comprises:

extracting a sine integer-harmonic component of the total DC current;

extracting the plurality of cosine even-numbered-harmonic components of the first reference current;

calculating a sum of the target current, the sine integer-harmonic component, and the plurality of cosine even-numbered-harmonic components to generate a second reference current; and calculating a difference between the second reference current and a differential-mode current to generate the compensation current, wherein the differential-mode current is a difference between the live-wire current and the neutral-wire current.

8. A power conversion system, comprising:

a power source;

a load;

a plurality of power conversion modules connected in parallel, wherein each of the power conversion modules is configured to convert an AC power of the power source into a DC power to be provided to the load; and a plurality of switch control devices respectively connected to the plurality of power conversion modules, wherein the plurality of switch control devices are configured to execute the circular current suppression method as claimed in claim 1.

9. The switch control device as claimed in claim 8, wherein each of the plurality of power conversion modules comprises:

a power factor corrector connected to the power source, wherein the power factor corrector is configured to convert a plurality of input currents into a positive bus voltage and a negative bus voltage based on at least one switching command, and the power factor corrector is an I-type neutral-point-clamp converter or a T-type neutral-point-clamp converter;

a positive bus capacitor comprising a positive electrode and a negative electrode, wherein the positive electrode of the positive bus capacitor is connected to a positive terminal of the power factor corrector, the negative electrode of the positive bus capacitor is connected to a neutral terminal of the power factor corrector, and a voltage across the positive bus capacitor is the positive bus voltage;

a negative bus capacitor comprising a positive electrode and a negative electrode, wherein the positive electrode of the negative bus capacitor is connected to the neutral terminal, the negative electrode of the negative bus capacitor is connected to a negative terminal of the power factor corrector, and a voltage across the negative bus capacitor is the negative bus voltage; and a DC converter connected to the power factor corrector, the positive bus capacitor, and the negative bus capacitor, wherein the DC converter is configured to convert the positive bus voltage and the negative bus voltage into the DC power.

10. A switch control device, comprising:

a circular-current suppression module configured to calculate a common-mode current based on a plurality of input currents of a power factor corrector to convert into a first reference voltage;

a voltage balance module connected to the circular-current suppression module, wherein the voltage balance module is configured to calculate a difference between the first reference voltage and a bus-voltage difference to convert into a first reference current, wherein the bus-voltage difference is a difference between the positive bus voltage and the negative bus voltage; and a switch control module connected to the voltage balance module, wherein the switch control module comprises:

a total DC voltage module configured to calculate a difference between a second reference voltage and a total voltage to convert into a total DC current, wherein the total voltage is a sum of the positive bus voltage and the negative bus voltage; and at least one current control module connected to the total DC voltage module and configured to add a plurality of cosine even-numbered-harmonic components of the first reference current based on the total DC current, a target current, and one of the plurality of input currents to calculate a compensation current in a harmonic-current control mode and convert the compensation current into a compensation voltage to serve as one of at least one switching command.

11. The switch control device as claimed in claim 10, wherein the plurality of input currents are associated with a three-phase AC power source, and the circular-current suppression module comprises:

a calculator connected to the power factor corrector and configured to calculate the common-mode current according to the plurality of input currents of the power factor corrector as a function as the following:

$$i_z = \frac{i_{LR} + i_{LS} + i_{LT}}{3},$$

wherein $i_z$ is the common-mode current, $i_{LR}$, $i_{LS}$, and $i_{LT}$ are the plurality of input currents, and the common-mode current is an average value of the plurality of input currents; and a first proportional-integral (PI) controller connected to the calculator and configured to convert the common-mode current to the first reference voltage.

12. The switch control device as claimed in claim 11, wherein the at least one current control module comprises a plurality of current control modules associated with the three-phase AC power source, and each of the plurality of current control modules comprises:

a sine function generator connected to the total DC voltage module and configured to extract a sine integer-harmonic component of the total DC current;

a cosine function generator connected to the voltage balance module and configured to extract the plurality of cosine even-numbered-harmonic components of the first reference current;

a first adder connected to the sine function generator and the cosine function generator and configured to calculate a sum of the target current, the sine integer-harmonic component, and the plurality of cosine even-numbered-harmonic components to generate a second reference current;

a first subtractor connected to the first adder and configured to calculate a difference between the second reference current and one of the plurality of input currents to generate the compensation current; and a second proportional-integral (PI) controller connected to the first subtractor and configured to convert the compensation current into the compensation voltage.

13. The switch control device as claimed in claim 12, wherein the switch control module further comprises a zero-sequence voltage injection module comprising:

a second adder connected to the voltage balance module and configured to calculate a sum of a voltage corresponding to the first reference current and a target voltage in a zero-sequence voltage injection mode to generate a third reference voltage; and a gain amplifier connected to the second adder and configured to multiply the third reference voltage by a coefficient to generate a zero-sequence voltage, wherein the coefficient is an arbitrary real number.

14. The switch control device as claimed in claim 13, wherein each of the plurality of current control modules further comprises:

a third adder connected to the second PI controller and configured to add the compensation voltage and the zero-sequence voltage to generate one of the at least one switching command.

15. The switch control device as claimed in claim 10, wherein one of the plurality of input currents is associated with a single-phase AC power source, and the circular-current suppression module is configured to calculate the common-mode current based on the plurality of input currents of the power factor corrector according to a function as the following:

$$i_z = \frac{i_L + i_N}{2},$$

wherein $i_z$ is the common-mode current, $i_L$ is a live-wire current among the plurality of input currents, $i_N$ is a neutral-wire current among the plurality of input currents, and the common-mode current is an average value of the live-wire current and the neutral-wire current.

16. The switch control device as claimed in claim 15, wherein the at least one current control module comprises a current control module associated with the single-phase AC power source and comprising:

a sine function generator connected to the total DC voltage module and configured to extract a sine integer-harmonic component of the total DC current;

a cosine function generator connected to the voltage balance module and configured to extract the plurality of cosine even-numbered-harmonic components of the first reference current;

a first adder connected to the sine function generator and the cosine function generator and configured to calculate a sum of the target current, the sine integer-harmonic component, and the plurality of cosine even-numbered-harmonic components to generate a second reference current;

a first subtractor connected to the first adder and configured to calculate a difference between the second reference current and a differential-mode current to generate the compensation current, wherein the differential-mode current is a difference between the live-wire current and the neutral-wire current; and a second proportional-integral (PI) controller connected to the first subtractor and configured to convert the compensation current into the compensation voltage.

17. The switch control device as claimed in claim 16, wherein the switch control module further comprises a zero-sequence voltage injection module comprising:

a second adder connected to the voltage balance module and configured to calculate a sum of a voltage corresponding to the first reference current and a target voltage in a zero-sequence voltage injection mode to generate a third reference voltage; and a gain amplifier connected to the second adder and configured to multiply the third reference voltage by a coefficient to generate a zero-sequence voltage, wherein the coefficient is an arbitrary real number.

18. The switch control device as claimed in claim 17, wherein the current control module further comprises:

a third adder connected to the second PI controller and configured to add the compensation voltage and the zero-sequence voltage to generate one of the at least one switching command.

19. The switch control device as claimed in claim 10, wherein the voltage balance module comprises:

a second subtractor connected to the circular-current suppression module and configured to calculate a difference between the first reference voltage and a bus-voltage difference; and a third proportional-integral (PI) controller connected to the second subtractor and configured to convert the difference between the first reference voltage and the bus-voltage difference into the first reference current.

20. The switch control device as claimed in claim 10, wherein the total DC voltage module comprises:

a third subtractor configured to calculate a difference between the second reference voltage and the total voltage; and a fourth proportional-integral (PI) controller connected to the third subtractor and configured to convert the difference between the second reference voltage and the total voltage into the total direct current.

* * * * *